United States Patent
Tsukamoto et al.

(10) Patent No.: US 11,715,003 B2
(45) Date of Patent: Aug. 1, 2023

(54) OPTIMIZATION SYSTEM, OPTIMIZATION APPARATUS, AND OPTIMIZATION SYSTEM CONTROL METHOD FOR SOLVING OPTIMIZATION PROBLEMS BY A STOCHASTIC SEARCH

(71) Applicant: FUJITSU LIMITED, Kawasaki (JP)

(72) Inventors: Sanroku Tsukamoto, Setagaya (JP);
Satoshi Matsubara, Machida (JP);
Hirotaka Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 997 days.

(21) Appl. No.: 16/266,165

(22) Filed: Feb. 4, 2019

(65) Prior Publication Data

US 2019/0244098 A1  Aug. 8, 2019

(30) Foreign Application Priority Data

Feb. 6, 2018 (JP) .................................. 2018-019544

(51) Int. Cl.
*G06N 3/08* (2023.01)
*G06N 3/047* (2023.01)

(52) U.S. Cl.
CPC ............... *G06N 3/08* (2013.01); *G06N 3/047* (2023.01)

(58) Field of Classification Search
CPC ................. G06N 3/0472; G06N 3/08
See application file for complete search history.

(56) References Cited

U.S. PATENT DOCUMENTS 5,134,685 A * 7/1992 Rosenbluth .......... G06N 3/0635
706/25
5,333,239 A * 7/1994 Watanabe ................ G06N 3/04
706/25

(Continued)

FOREIGN PATENT DOCUMENTS

JP H7-191951 7/1995
JP H8-22446 1/1996

OTHER PUBLICATIONS

Wen et al. (A review of Hopfield neural networks for solving mathematical programming problems, 2008, pp. 675-687) (Year: 2008).*

(Continued)

*Primary Examiner* — George Giroux
(74) *Attorney, Agent, or Firm* — Fujitsu Patent Center

(57) ABSTRACT

An optimization apparatus calculates a first portion, among energy change caused by change in value of a neuron of a neuron group, caused by influence of another neuron of the neuron group, determines whether to allow updating the value, based on a sum of the first and second portions of the energy change, and repeats a process of updating or maintaining the value according to the determination. An arithmetic processing apparatus calculates the second portion caused by influence of a neuron not belonging to the neuron group and an initial value of the sum. A control apparatus transmits data for calculating the second portion and the initial value to the arithmetic processing apparatus, and the initial value and data for calculating the first portion to the optimization apparatus, and receives the initial value from the arithmetic processing apparatus, and a value of the neuron group from the optimization apparatus.

7 Claims, 18 Drawing Sheets

(56) References Cited

U.S. PATENT DOCUMENTS

| | | | | |
|---|---|---|---|---|
| 5,343,555 | A | * | 8/1994 | Yayla .................. G06N 3/0675 706/35 |
| 5,621,862 | A | | 4/1997 | Nakahira et al. |
| 2006/0089824 | A1 | * | 4/2006 | Siekmeier ............. G16C 20/30 703/11 |
| 2015/0324690 | A1 | * | 11/2015 | Chilimbi ................. G06N 3/08 706/25 |
| 2017/0364477 | A1 | * | 12/2017 | Thach .................... G06N 3/044 |
| 2018/0075342 | A1 | * | 3/2018 | Tamura ................. G06N 3/044 |

OTHER PUBLICATIONS

Yutaka Arima et al., "A 336-Neuron, 28K-Synapse, Self-Learning Neural Network Chip with Branch-Neuron-Unit Architecture", Proceedings of IEEE Journal of Solid-State Circuits, vol. 26, No. 11, Nov. 1991, pp. 1637-1644 (8 pages).

\* cited by examiner

OPTIMIZATION SYSTEM, OPTIMIZATION APPARATUS, AND OPTIMIZATION SYSTEM CONTROL METHOD FOR SOLVING OPTIMIZATION PROBLEMS BY A STOCHASTIC SEARCH

CROSS-REFERENCE TO RELATED APPLICATION

This application is based upon and claims the benefit of priority of the prior Japanese Patent Application No. 2018-019544, filed on Feb. 6, 2018, the entire contents of which are incorporated herein by reference.

FIELD

The embodiments discussed herein are related to an optimization system, an optimization apparatus, and an optimization system control method.

BACKGROUND

The use of an optimization apparatus (which may also be referred to as an Ising machine or a Boltzmann machine) using an Ising-type energy function is known as a method for solving multivariable optimization problems at which Neumann type computers are poor. The optimization apparatus performs a calculation by replacing a problem to be calculated with an Ising model indicative of the behavior of the spin of a magnetic material.

For example, the optimization apparatus also performs modeling by the use of a neural network. In that case, each of a plurality of units (bits) included in the optimization apparatus functions as a neuron which outputs "0" or "1" according to the state of another bit and a weighting coefficient (which is also referred to as a coupling coefficient) indicative of coupling strength between another bit and each bit itself. The optimization apparatus finds, by a stochastic search method such as simulated annealing, as a solution a combination of the state of each bit by which the minimum value of the above energy function (which is also referred to as a cost function or an objective function) is obtained.

The method of enlarging the scale of a network by connecting a plurality of neural network circuits was proposed as an example of neural network technology. Furthermore, the following technique was proposed. Connection information regarding a neural network is stored in a storage unit and this connection information is rewritten. By doing so, a change in the connection state of the neural network accommodates a small-scale neural network to a large-scale neural network.

See, for example, Japanese Laid-open Patent Publication No. 07-191951 and Japanese Laid-open Patent Publication No. 08-22446.

If an optimization apparatus which performs many repetitive operations by the stochastic search method is realized by hardware, the amount of the hardware increases with an increase in the scale of an optimization problem (with an increase in the number of bits).

SUMMARY

According to an aspect, there is provided an optimization system including: an optimization apparatus configured to calculate a first change portion of an energy change caused by a change in a value of a first neuron that belongs to a neuron group selected from all neurons corresponding to all state variables of an evaluation function indicative of an energy, the first change portion being caused by an influence of another neuron that belongs to the neuron group, determine by a stochastic search whether to allow an update of the value of the first neuron, based on a sum of the first change portion and a second change portion of the energy change, and repeat an update process of updating or maintaining the value of the first neuron according to a result of determining whether to allow the update; an arithmetic processing apparatus configured to calculate an initial value of the sum and the second change portion caused by an influence of a second neuron that is included in all the neurons but does not belong to the neuron group; and a control apparatus configured to select the neuron group from all the neurons, transmit to the arithmetic processing apparatus first data for calculating the second change portion and the initial value, receive the initial value from the arithmetic processing apparatus, transmit to the optimization apparatus the initial value and second data for calculating the first change portion, and receive a value of the neuron group from the optimization apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
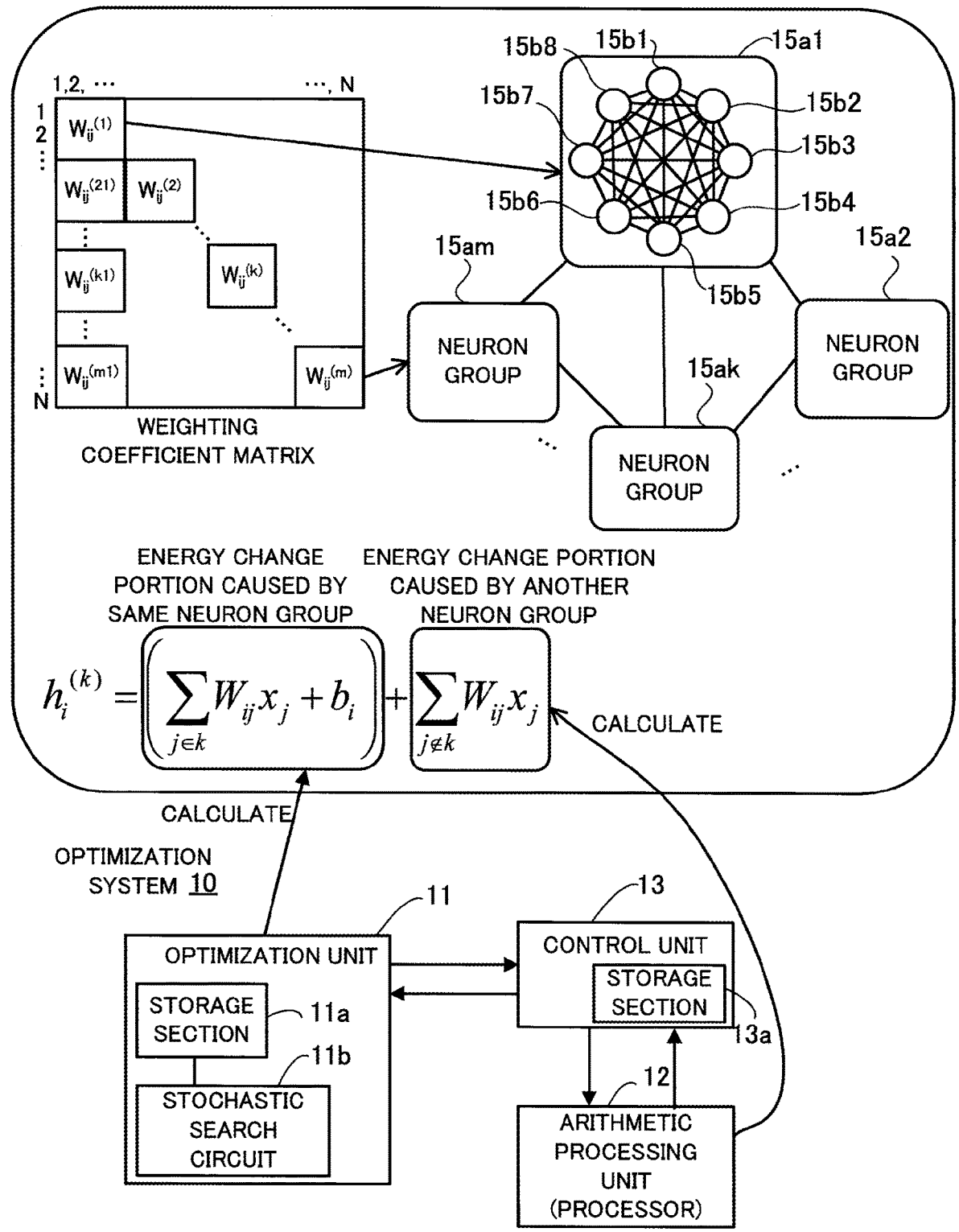
FIG. 1 illustrates an example of an optimization system according to a first embodiment.

Embodiments will now be described with reference to the accompanying drawings.

First Embodiment

An optimization system described below is for calculating an optimization problem, such as a traveling salesman problem, by the use of an Ising-type energy function, which is an evaluation function indicative of energy. For example, the Ising-type energy function $E(x)$ is defined as the following expression (1).

$$E(x) = -\sum_{(i,j)} W_{ij} x_i x_j - \sum_i b_i x_i \quad (1)$$

The first term of the right side means that the products of values (0 or 1) and a weighting coefficient of two neurons are added up without omission or duplication for all combinations of two neurons selected from among all neurons (all bits). $x_i$ indicates a value of an ith neuron. $x_j$ indicates a value of a jth neuron. $W_{ij}$ is a weighting coefficient indicative of coupling strength between the ith neuron and the jth neuron. Note that $W_{ij}=W_{ji}$ and $W_{ii}=0$.

The second term of the right side means that the product of a bias and a value of each of all the neurons is added up. $b_i$ indicates a bias of the ith neuron.

In addition, an energy change $\Delta E_i$ caused by the inversion of a spin (value change) of the ith neuron is given by the following expression (2).

$$\Delta E_i = (2x_i - 1) \cdot \left( \sum_j W_{ij} x_j + b_i \right) \quad (2)$$

In expression (2), $(2x_i-1)=1$ when a value $x_i$ of the ith neuron is 1. $(2x_i-1)=-1$ when the value $x_i$ is 0. $h_i$ given by the following expression (3) is referred to as a local field and the energy change $\Delta E_i$ is obtained by multiplying the local field $h_i$ by a sign (+1 or -1) according to the value $x_i$.

$$h_i = \sum_j W_{ij} x_j + b_i \quad (3)$$

FIG. 1 illustrates an example of an optimization system according to a first embodiment.

An optimization system 10 calculates by a stochastic search a combination of values of neurons which minimize a value of the energy function $E(x)$ represented by the above expression (1) or minimize a value of the energy function $E(x)$ represented by the above expression (1) during a determined period of time (or during a determined number of operations).

The optimization system 10 according to the first embodiment includes an optimization unit 11, an arithmetic processing unit 12, and a control unit 13.

The optimization unit 11 calculates a change portion (hereinafter referred to as a first change portion), of an energy change caused by a change in the value of a neuron which belongs to a neuron group selected from among all neurons by the control unit 13, caused by the influence of another neuron which belongs to the neuron group. Data used for calculating the first change portion are transmitted from the control unit 13. Furthermore, the optimization unit 11 determines whether to allow an update of a value of the neuron which belongs to the neuron group selected by the control unit 13 by a stochastic search on the basis of the sum of a change portion (hereinafter referred to as a second change portion), of the above energy change, caused by the influence of a neuron which does not belong to the above neuron group and the first change portion. Hereinafter the sum of the first change portion and the second change portion will be referred to as a local field $h_i^{(k)}$. In addition, the optimization unit 11 updates or maintains the value of the neuron on the basis of a result obtained by determining whether to allow the update of the value of the neuron. The optimization unit 11 repeats the above process. An initial value of the local field $h_i^{(k)}$ is calculated by the arithmetic processing unit 12 and is supplied to the optimization unit 11 via the control unit 13.

For example, the optimization unit 11 is realized on one chip. Furthermore, the optimization unit 11 includes a storage section 11a and a stochastic search circuit 11b.

For example, the storage section 11a stores data (such as a weighting coefficient, a bias, and a value of a neuron) used for calculating the above first change portion and an initial value of the local field $h_i^{(k)}$. A volatile memory, such as a random access memory (RAM), or a nonvolatile memory, such as a flash memory or an electrically erasable programmable read only memory (EEPROM), may be used as the storage section 11a.

On the basis of the local field $h_i^{(k)}$, the stochastic search circuit 11b determines whether to allow an update of a value of a neuron which belongs to a neuron group determined by a stochastic search and repeats an update process in which the stochastic search circuit 11b updates or maintains the value of the neuron on the basis of a result obtained by determining whether to allow the update of the value of the neuron. The initial value of the local field $h_i^{(k)}$ is used in the first process of these repeated processes and is updated on the basis of the calculated first change portion. An example of the stochastic search circuit 11b will be described later.

The arithmetic processing unit 12 receives from the control unit 13 data used for calculating the above second change portion and the initial value of the local field $h_i^{(k)}$. Furthermore, the arithmetic processing unit 12 calculates the second change portion and the initial value of the local field $h_i^{(k)}$. In addition, the arithmetic processing unit 12 transmits the initial value of the local field $h_i^{(k)}$ calculated to the control unit 13. The arithmetic processing unit 12 may transmit the second change portion calculated to the control unit 13.

The arithmetic processing unit 12 is a processor such as a central processing unit (CPU) or a digital signal processor (DSP). However, the arithmetic processing unit 12 may include an application specific electronic circuit such as an application specific integrated circuit (ASIC) or a field programmable gate array (FPGA). The processor executes a program stored in a memory such as RAM.

The control unit 13 selects from all the neurons the neuron group for which the control unit 13 makes the optimization unit 11 perform a value update process. Furthermore, the control unit 13 transmits to the arithmetic processing unit 12 the data (such as a weighting coefficient and a value of a neuron) used for calculating the above second change portion and the initial value of the local field $h_i^{(k)}$. In addition, the control unit 13 receives the initial value of the local field $h_i^{(k)}$ and transmits to the optimization unit 11 the data used for calculating the first change portion and the initial value of the local field $h_i^{(k)}$. Moreover, the control unit 13 receives a value of the neuron group from the optimization unit 11.

For example, the control unit 13 is a controller including a specific-purpose electronic circuit such as an ASIC or an FPGA. The control unit 13 may be a processor such as a CPU or a DSP.

The control unit 13 includes a storage section 13a which stores the data used for calculating the first change portion, the second change portion, and the initial value of the local field $h_i^{(k)}$. The data stored in the storage section 13a include initial values of all the neurons and a weighing coefficient indicative of coupling strength for each of all combinations of two neurons selected from all the neurons. For example, the storage section 13a is a nonvolatile memory such as a flash memory, an EEPROM, or a hard disk drive (HDD).

The arithmetic processing unit 12 and the control unit 13 may be realized by one processor.

An example of the operation of the optimization system 10 according to the first embodiment will now be described.

FIG. 1 illustrates m neuron groups 15a1, 15a2, . . . , 15ak, . . . , and 15am. Each of the neuron groups 15a1 through 15am includes a plurality of neurons. It is assumed that each of the neuron groups 15a1 through 15am includes n neurons. Then the number N of all neurons is m×n. For example, the neuron group 15a1 includes neurons 15b1, 15b2, 15b3, 15b4, 15b5, 15b6, 15b7, and 15b8.

In the example of FIG. 1, the neurons 15b1 through 15b8 are coupled to one another. That is to say, the neurons 15b1 through 15b8 are in a fully coupled state. Furthermore, each of the neurons 15b1 through 15b8 is coupled to part of neurons included in the neuron groups 15a2 through 15am.

The number of couplings between neuron groups restrains mapping an optimization problem (setting weighting coefficients or programming). For example, however, it is assumed that the number of neurons included in each neuron group is 1024. If the number of couplings between neuron groups is about a tenth of the number of couplings in a neuron group, then programming is possible in many cases and a problem does not arise.

For example, it is assumed that the number of couplings between neuron groups is 128, that is to say, each neuron can be coupled to 128 neurons included in other neuron groups. Then the number of weighting coefficients to be prepared in one neuron group is $1024^2+1024\times128$. For example, it is assumed that the number of neuron groups is 4. If (1024×4) neurons are coupled to one another, then the number of weighting coefficients is about $4.52\times10^6$. Limiting the number of couplings between the neuron groups reduces the number of weighting coefficients to be prepared. That is to say, a reduction in the number of weighting coefficients stored in the storage section 13a or the like reduces the scale of the control unit 13.

As illustrated in FIG. 1, each of weighting coefficient groups ($W_{ij}^{(1)}$, $W_{ij}^{(2)}$, . . . , $W_{ij}^{(k)}$, . . . , and $W_{ij}^{(m)}$) on the diagonal portion of a weighting coefficient matrix consists of weighting coefficients indicative of coupling strength between neurons included in each of the neuron groups 15a1 through 15am. For example, the weighting coefficient group $W_{ij}^{(1)}$ consists of weighting coefficients indicative of coupling strength for each of all the combinations obtained by selecting two neurons from the neurons 15b1 through 15b8 included in the neuron group 15a1.

On the other hand, each of weighting coefficient groups (such as $W_{ij}^{(2)}$, . . . , $W_{ij}^{(k1)}$, and $W_{ij}^{(m1)}$) on the non-diagonal portion of the weighting coefficient matrix consists of weighting coefficients indicative of coupling strength between neurons which belong to different neuron groups. Because many of neurons which belong to different neuron groups are not coupled to one another, many of weighting coefficients included in the weighting coefficient groups on the non-diagonal portion have the value 0.

On the basis of a local field of each neuron included in a neuron group selected from the above neuron groups 15a1 through 15am by the control unit 13, for example, the optimization unit 11 performs the process of updating its value.

For example, if the kth neuron group 15ak is selected, a local field $h_i^{(k)}$ at the time of a change of the ith neuron of a plurality of neurons included in the neuron group 15ak is represented by the following expression (4).

$$h_i^{(k)} = \left(\sum_{j \in k} W_{ij} x_j + b_i\right) + \sum_{j \notin k} W_{ij} x_j \qquad (4)$$

In expression (4), the sum of a product-sum operation portion of the first term and a bias of the second term of the right side indicates an energy change portion (corresponding to the above first change portion) caused by the influence of the other neurons (neurons other than the ith neuron) included in the kth neuron group 15ak. In addition, a product-sum operation portion of the third term of the right side indicates an energy change portion (corresponding to the above second change portion) caused by the influence of neurons (which belong to the other neuron groups) which do not belong to the kth neuron group 15ak.

The optimization unit 11 calculates the first change portion and does not calculate the second change portion. The optimization unit 11 receives via the control unit 13 an initial value of the local field $h_i^{(k)}$ calculated by the arithmetic processing unit 12. Furthermore, the stochastic search circuit 11b of the optimization unit 11 updates the local field $h_i^{(k)}$ indicated by expression (4) on the basis of a result obtained by calculating the first change portion. For example, the stochastic search circuit 11b adds a noise value (random number) to the local field $h_i^{(k)}$, determines whether to allow an update of a value of the ith neuron by comparison with a threshold, and updates or maintains the value of the ith neuron on the basis of a determination result. The stochastic search circuit 11b repeats this process many times (million times, for example) for each bit which belongs to the neuron group 15ak. Calculating a second change portion for a neuron group and the initial value of the local field $h_i^{(k)}$ one time is sufficient. Therefore, the load on the arithmetic processing unit 12 is light. The reason for this is as follows.

Figure 2:
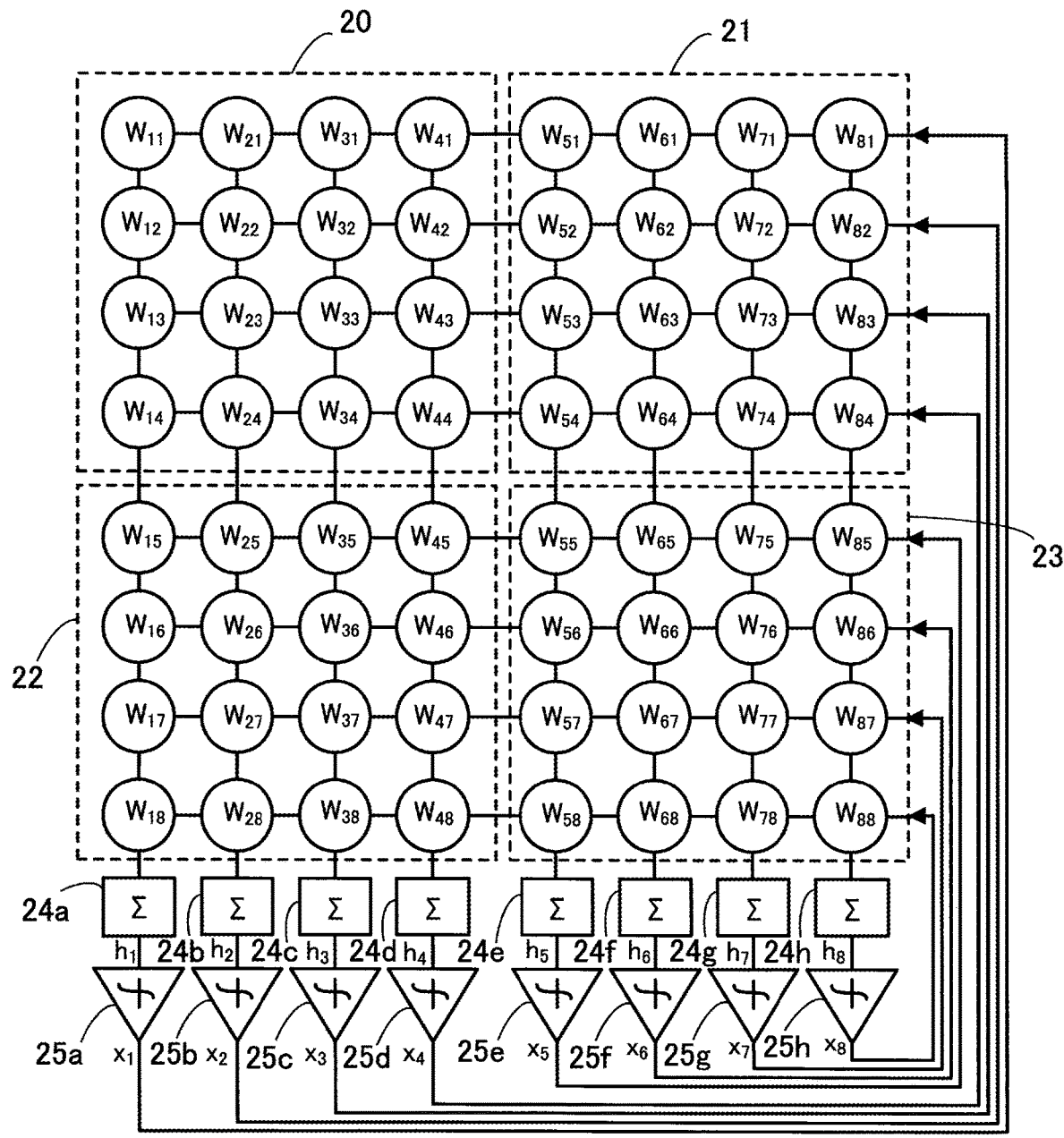
FIG. 2 is a schematic view for describing an example of an operation performed by the optimization system according to the first embodiment.

FIG. 2 is a schematic view for describing an example of an operation performed by the optimization system according to the first embodiment.

The example of FIG. 2 is as follows. In order to simplify explanation, the number N of all neurons is eight, the number of neuron groups is two, and the weighting coefficient matrix illustrated in FIG. 1 consists of four weighting coefficient groups 20, 21, 22, and 23 (that is to say, m=2 in FIG. 1).

For example, the weighting coefficient group 20 consists of weighting coefficients indicative of coupling strength between neurons (whose number is four) included in the neuron group 15a1 illustrated in FIG. 1 and corresponds to $W_{ij}^{(1)}$ illustrated in FIG. 1. The weighting coefficient group 23 consists of weighting coefficients indicative of coupling strength between neurons included in the neuron group 15a2 illustrated in FIG. 1 and corresponds to $W_{ij}^{(2)}$ illustrated in FIG. 1.

Each of integrators 24a, 24b, 24c, 24d, 24e, 24f, 24g, and 24h integrates the product of a weighting coefficient $W_{IJ}$ in a column of which it is in charge and a value of a neuron whose index is indicated by "J" of the weighting coefficient $W_{IJ}$ to calculate a local field $h_I$.

For example, the integrator 24a integrates $W_{12}x_2$, $W_{13}x_3$, $W_{14}x_4$, $W_{15}x_5$, $W_{16}x_6$, $W_{17}x_7$, and $W_{18}x_8$ to calculate a local field $h_1$.

Each of determiners 25a, 25b, 25c, 25d, 25e, 25f, 25g, and 25h adds a bias or a noise value to the local field $h_1$, determines whether to allow an update of a value $x_I$ by comparison with a threshold, and updates or maintains the value $x_I$ on the basis of a determination result.

For example, the determiner 25a adds a bias or a noise value to the local field $h_1$, determines whether to allow the update of the value $x_1$ by comparison with a threshold (0, for example), and updates or maintains the value $x_1$ on the basis of a determination result.

In FIG. 2, "I" or "J" of the weighting coefficient $W_{IJ}$, the value $x_I$, or the local field $h_I$ is not an index of a neuron in each neuron group but a global index for all the neurons. For example, if a value of an ith neuron in a kth neuron group 15ak is represented as $x_i^{(k)}$, then $x_i^{(k)} = x_{(k-1) \times n + i}$, (k−1)×n+i corresponds to the global index I. Similarly, if a local field of the ith neuron in the kth neuron group 15ak is represented as $h_i^{(k)}$, then $h_i^{(k)} = h_{(k-1) \times n + i}$. Furthermore, if a weighting coefficient indicative of coupling strength between the ith neuron and a jth neuron included in the kth neuron group 15ak is represented as $W_{ij}^{(k)}$, then $W_{ij}^{(k)} = W_{(k-1) \times n + i, (k-i) \times j}$. (k−1)×n+j corresponds to the global index J.

It is assumed that the control unit 13 included in the optimization system 10 selects the neuron group 15a1 which consists of the neurons whose global indexes I are 1 through 4. In this case, the optimization unit 11 determines whether to allow an update of the values $x_1$ through $x_4$ by a stochastic search, such as simulated annealing, and repeats the process of determining update or maintenance many times. At this time, a product-sum operation using the values $x_1$ through $x_4$ and the weighting coefficient group 20, that is to say, the above first change portion is calculated every time. On the other hand, the values $x_5$ through $x_8$ are not updated. Therefore, performing a product-sum operation using the weighting coefficient group 22 and the values $x_5$ through $x_8$ one time, that is to say, calculating the above second change portion one time is sufficient.

As a result, the optimization unit 11 receives via the control unit 13 an initial value of a local field $h_i^{(k)}$ ($h_1$ through $h_4$ in the example of FIG. 2) calculated by the arithmetic processing unit 12. After that, the optimization unit 11 updates the local field $h_i^{(k)}$ on the basis of the first change portion calculated every time. That is to say, calculating the second change portion and the initial value of the local field $h_i^{(k)}$ one time is sufficient.

If an iterative process is performed a determined number of times, the control unit 13 selects the next neuron group 15a2 (which consists of the neurons whose global indexes I are 5 through 8) for which the control unit 13 makes the optimization unit 11 perform an update process. After that, the same process is repeated.

For example, the control unit 13 outputs as a solution to an optimization problem the values $x_1$ through $x_8$ which are obtained after the optimization unit 11 performs an update process for the neuron group 15a2 a determined number of times. The control unit 13 may make the optimization unit 11 perform an operation for the neuron group 15a1 again.

With the above optimization system 10 according to the first embodiment, the arithmetic processing unit 12 is made to calculate an energy change portion (second change portion) caused by the influence of the other neuron groups. This reduces the amount of the hardware of the optimization unit 11. For example, the amount of hardware at the time of implementing the integrators 24a through 24h illustrated in FIG. 2 in the optimization unit 11 is reduced. Furthermore, the number of weighting coefficients stored in the storage section 11a of the optimization unit 11 is reduced. This reduces the capacity of the storage section 11a. As a result, even a small amount of hardware enables a large-scale operation. In addition, there is no need to load into the optimization unit 11a weighting coefficient indicative of coupling strength between a neuron which belongs to a selected neuron group and a neuron which does not belong to the selected neuron group. This reduces calculation time and power consumption. Moreover, the optimization unit 11 accommodates a change in the scale of an optimization problem. As a result, great flexibility is realized.

Second Embodiment

Figure 3:
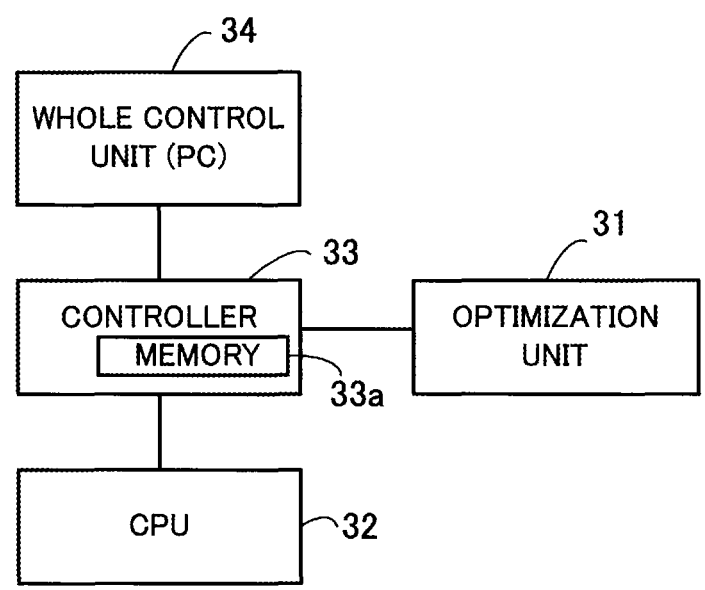
FIG. 3 illustrates an example of an optimization system according to a second embodiment.

FIG. 3 illustrates an example of an optimization system according to a second embodiment.

An optimization system 30 includes an optimization unit 31, a CPU 32, a controller 33, and a whole control unit 34.

The optimization unit 31 has the same function as the optimization unit 11 illustrated in FIG. 1 has. The CPU 32 is an example of the arithmetic processing unit 12 illustrated in FIG. 1. The controller 33 is an example of the control unit 13 illustrated in FIG. 1.

The whole control unit 34 is, for example, a personal computer (PC) and designates the controller 33 to, for example, start or end the process of calculating an optimization problem.

Figure 4:
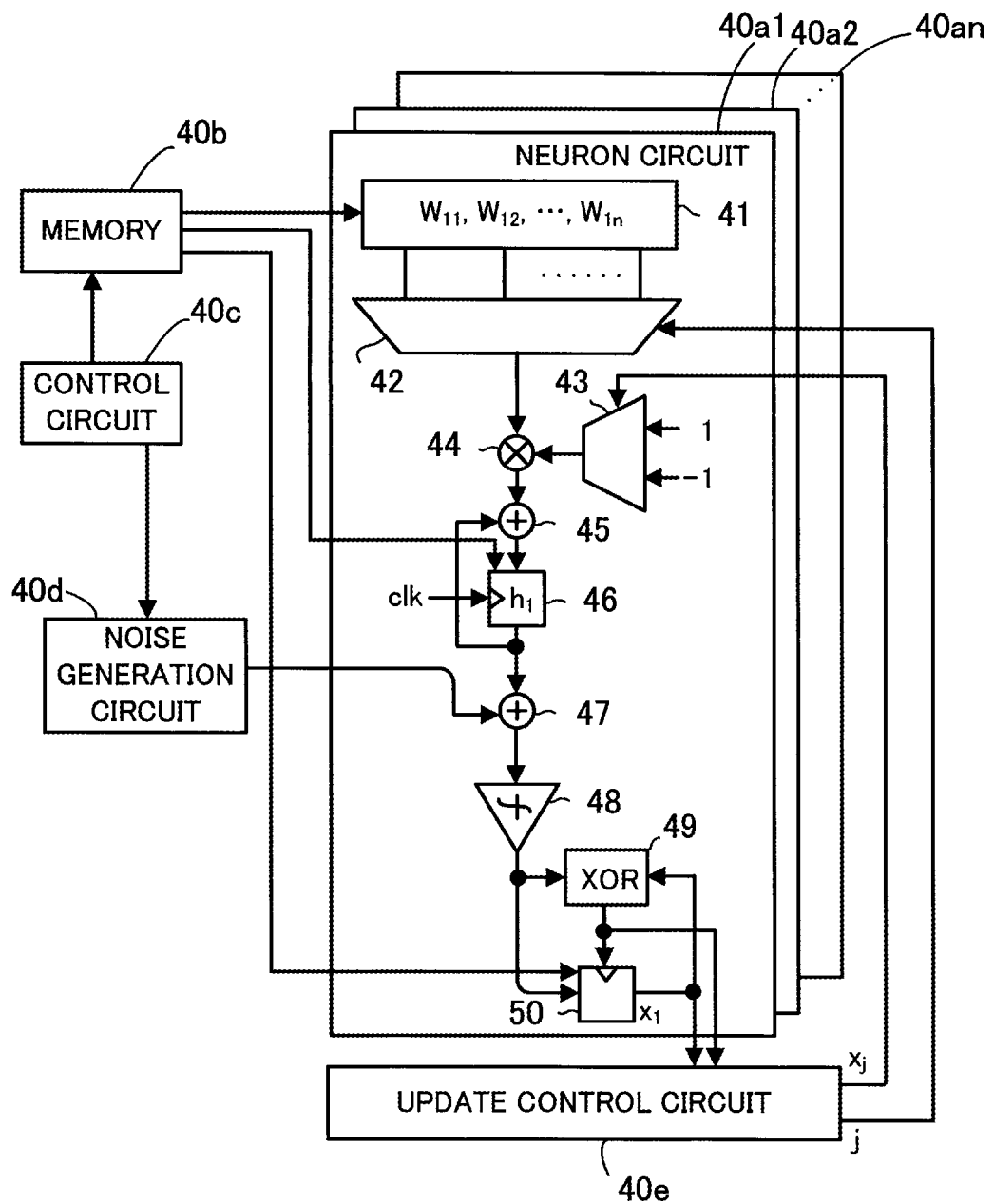
FIG. 4 illustrates an example of an optimization unit.

FIG. 4 illustrates an example of an optimization unit.

An example of the optimization unit 31 illustrated in FIG. 4 performs an operation of an Ising type energy function of a neural network by small-scale hardware based on an algorithm referred to as the DeGloria algorithm.

The optimization unit 31 is, for example, a one-chip semiconductor integrated circuit and includes neuron circuits 40a1, 40a2, . . . , and 40an each of which outputs a value of a neuron, a memory 40b, a control circuit 40c, a noise generation circuit 40d, and an update control circuit 40e. A circuit including the neuron circuits 40a1 through 40an, the control circuit 40c, the noise generation circuit 40d, and the update control circuit 40e is an example of the stochastic search circuit 11b illustrated in FIG. 1. A value outputted by each of the neuron circuits 40a1 through 40an corresponds to a value of one of, for example, the neuron groups 15a1 through 15am illustrated in FIG. 1.

FIG. 4 illustrates an example of the neuron circuit 40a1. The other neuron circuits 40a2 through 40an are also realized by the same circuit.

The neuron circuit 40a1 includes a register 41, selection circuits 42 and 43, a multiplier 44, an adder 45, a register 46, an adder 47, a comparator circuit 48, an XOR circuit 49 which is an exclusive-OR circuit, and a register 50.

The register 41 stores n weighting coefficients $W_{11}$, $W_{12}$, ..., and $W_{1n}$. The weighting coefficients $W_{11}$ through $W_{1n}$ are calculated in advance by a computer, such as the whole control unit 34, according to a problem to be calculated, are supplied to the optimization unit 31 by the controller 33, and are stored in the memory 40b. Furthermore, the weighting coefficients $W_{11}$ through $W_{1n}$ are read out from the memory 40b by the control circuit 40c and are stored in the register 41.

On the basis of an index outputted by the update control circuit 40e, the selection circuit 42 selects and outputs one of the weighting coefficients $W_{11}$ through $W_{1n}$ stored in the register 41.

For example, when index=n is inputted to the selection circuit 42, the selection circuit 42 selects the weighting coefficient $W_{1n}$.

It is assumed that a change in the value of only one neuron is allowed at a time with the convergence of calculation taken into consideration. When a value of a neuron is updated, a change amount resulting from the update is added to or subtracted from an original local field of a neuron to which the neuron whose value is updated is coupled.

For example, when a value $x_j$ (0 or 1) of a neuron whose index is j and which is coupled to a neuron whose index is i changes to $(1-x_j)$, a change amount $\Delta h_i$ of a local field of the neuron whose index is i is represented by the following expression (5).

$$\Delta h_i = h_i|_{x_j = 1 - x_j} - h_i = W_{ij}(1 - 2x_j) \quad (5)$$

When the value $x_j$ changes from 0 to 1, $(1-2x_j)$ in expression (5) becomes +1. When the value $x_j$ changes from 1 to 0, $(1-2x_j)$ in expression (5) becomes -1.

The selection circuit 43 realizes the calculation of $(1-2x_j)$ in expression (5). On the basis of a value after update of a neuron selected by the update control circuit 40e (a neuron having a value to which an update is allowed), the selection circuit 43 selects and outputs 1 or -1. When the value after update is 0, the selection circuit 43 selects and outputs -1. When the value after update is 1, the selection circuit 43 selects and outputs 1.

The multiplier 44 outputs the product of a weighting coefficient outputted by the selection circuit 42 and a value outputted by the selection circuit 43.

The adder 45 adds together a value outputted by the multiplier 44 and a value stored in the register 46 and outputs a value obtained.

The register 46 stores a value outputted by the adder 45 in synchronization with a clock signal clk. The register 46 is, for example, a flip-flop. The initial value of a local field $h_i^{(k)}$ represented by expression (4) is stored as an initial value in the register 46. The initial value of the local field $h_i^{(k)}$ is calculated by the CPU 32, is transmitted to the optimization unit 31 by the controller 33, and is stored in the memory 40b. For example, the neuron circuit 40a1 includes a selection circuit (not illustrated) which selects a value that the register 46 stores from a value read out from the memory 40b and a value outputted by the adder 45. For example, the clock signal clk is supplied from the control circuit 40c.

The adder 47 adds a noise value outputted by the noise generation circuit 40d to a local field $h_1$ outputted by the register 46 and outputs a value obtained.

When a value outputted by the adder 47 is greater than or equal to a threshold (0, for example), the comparator circuit 48 outputs 0. When a value outputted by the adder 47 is smaller than the threshold, the comparator circuit 48 outputs 1.

On the basis of a value outputted by the comparator circuit 48 and a value stored in the register 50, the XOR circuit 49 outputs a value indicative of whether to allow an update of a value of a neuron whose index is 1. For example, when the value outputted by the comparator circuit 48 matches the value stored in the register 50, the XOR circuit 49 outputs 0 which is indicative that the update is not allowed. When the value outputted by the comparator circuit 48 differs from the value stored in the register 50, the XOR circuit 49 outputs 1 which is indicative that the update is allowed.

The register 50 holds a value $x_1$ of the neuron whose index is 1. An initial value of the value $x_1$ is supplied from the memory 40b. For example, the neuron circuit 40a1 includes a selection circuit (not illustrated) which selects a value that the register 50 stores from a value read out from the memory 40b and a value outputted by the comparator circuit 48.

The memory 40b stores an initial value of a value of a neuron group selected by the controller 33, the initial value of the local field $h_i^{(k)}$, and weighting coefficients between neurons which belong to the selected neuron group. A volatile memory, such as a RAM, or a nonvolatile memory, such as a flash memory or an EEPROM, is used as the memory 40b.

The control circuit 40c controls reading out data stored in the memory 40b or writing data supplied from the controller 33 to the memory 40b. Furthermore, the control circuit 40c may control supplying the clock signal clk to the neuron circuits 40a1 through 40an or the width of noise outputted by the noise generation circuit 40d.

The noise generation circuit 40d generates a noise value for performing simulated annealing. A linear feedback shift register (LFSR) or the like is used as the noise generation circuit 40d. When the simulated annealing is performed, the noise generation circuit 40d gradually narrows the width of noise under the control of, for example, the control circuit 40c.

The update control circuit 40e accepts values $x_1$ through $x_n$ of neurons whose indexes are 1 through n respectively and which are outputted by the neuron circuits 40a1 through 40an respectively and a value indicative of whether to allow an update of a value of each neuron. Furthermore, on the basis of the value indicative of whether to allow the update of a value of each neuron, the update control circuit 40e determines whether there are neurons having values to which an update is allowed. If there are neurons having values to which an update is allowed, the update control circuit 40e selects one of the neurons. In addition, the update control circuit 40e supplies to the neuron circuits 40a1 through 40an an index of the selected neuron and a value after update.

For example, if the values of a plurality of neurons can be updated, then the update control circuit 40e randomly selects one of them on the basis of a random number and outputs an index of the neuron and a value after update. In the example of FIG. 4, index=j and a value $x_j$ of a neuron are outputted from the update control circuit 40e.

An example of the operation of the optimization system 30 illustrated in FIG. 3 will now be described.

Figure 5:
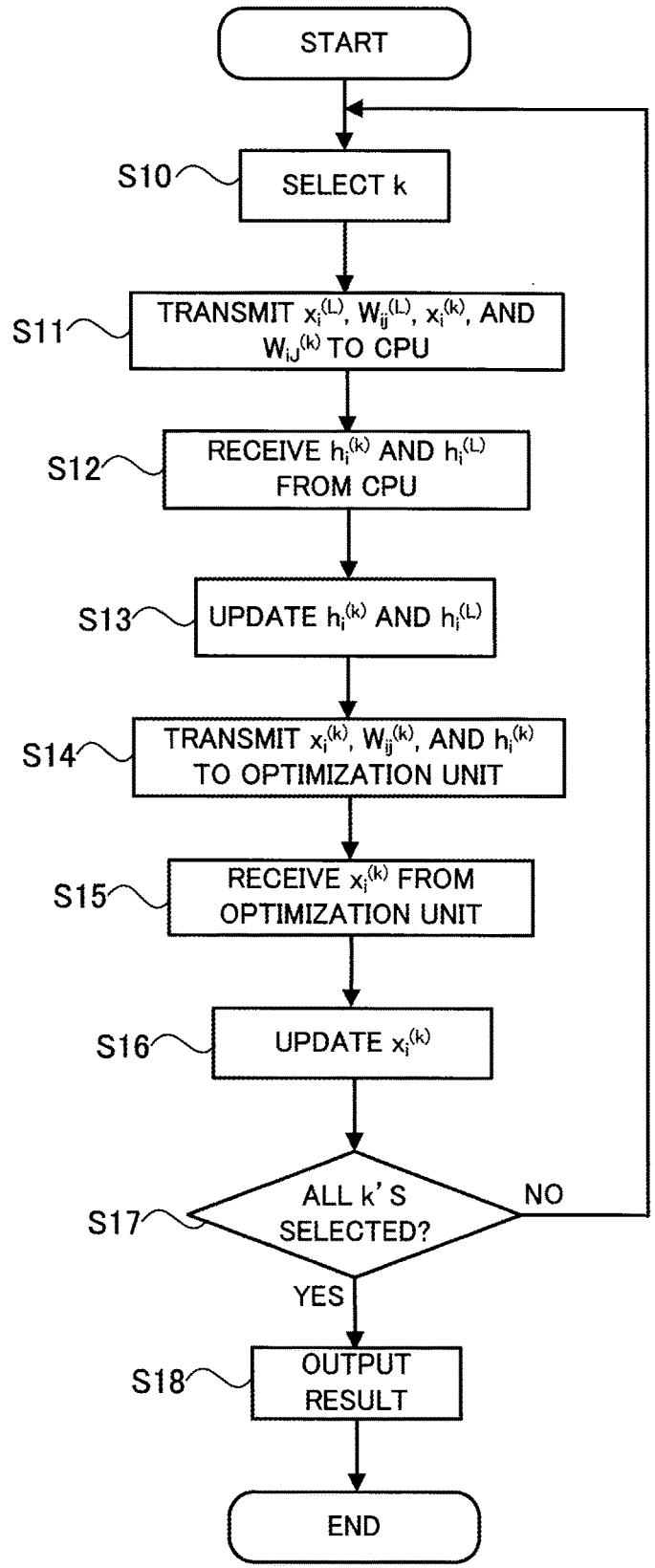
FIG. 5 is a flow chart illustrative of the flow of an example of the operation of a controller.

FIG. 5 is a flow chart illustrative of the flow of an example of the operation of the controller.

The controller 33 includes a memory 33a. A weighting coefficient matrix like that illustrated in FIG. 1, initial values of all neurons, and initial values of local fields are stored in the memory 33a. A nonvolatile memory, such as a flash memory, an EEPROM, or an HDD is used as the memory 33a.

In order to determine a weighting coefficient group, an initial value of a neuron, and an initial value of a local field $h_i^{(k)}$ to be supplied to the optimization unit 31, the controller 33 selects k (step S10). By doing so, the controller 33 determines a neuron group, of, for example, the neuron groups 15a1 through 15am illustrated in FIG. 1, for which the controller 33 gives the optimization unit 31 the charge of an update process. That is to say, selecting k corresponds to selecting a neuron group. The initial value of k may be designated by the whole control unit 34. In the example of FIG. 1, for example, the optimization unit 31 performs an update process for the neuron group 15a1 if k=1.

After the controller 33 selects k, the controller 33 transmits $x_i^{(L)}$, $X_{ij}^{(k)}$, $x_i^{(k)}$, and $W_{ij}^{(k)}$ to the CPU 32 on the basis of the selected k (step S11). $x_i^{(L)}$ and $W_{ij}^{(L)}$ are data used for calculating the above second change portion (hereinafter referred to as the change portion $h_i^{(L)}$) of the local field $h_i^{(k)}$. Hereinafter it is assumed that $x_i^{(L)}$ is a value of a neuron group other than the selected neuron group and that $x_i^{(k)}$ is a value of the selected neuron group.

In the example of FIG. 1, for example, $x_i^{(L)}$ are values of a plurality of neurons which do not belong to the neuron group 15a1 if k=1. Initial values stored in the memory 33a are used as the values of the neurons. Alternatively, if the values of the neurons are updated in a previous process, then values after the update are used as the values of the neurons. If k=1, $W_{ij}^{(L)}$ are the weighting coefficient groups $W_{ij}^{(21)}$ through $W_{ij}^{(m1)}$ illustrated in FIG. 1. Furthermore, if k=1, $x_i^{(k)}$ is a value of the neuron group 15a1 and $W_{ij}^{(k)}$ is the weighting coefficient group $W_{1j}^{(1)}$ illustrated in FIG. 1. An initial value stored in the memory 33a is used as $x_i^{(k)}$. Alternatively, if the value of the neuron is updated in a previous process, then a value after the update is used as $x_i^{(k)}$.

Next, the controller 33 receives from the CPU 32 the local field $h_i^{(k)}$ and the change portion $h_i^{(L)}$ calculated on the basis of the above data by the CPU 32 (step S12). Furthermore, the controller 33 updates the local field $h_i^{(k)}$ and the change portion $h_i^{(L)}$ stored in the memory 33a (step S13). Updating the change portion $h_i^{(L)}$ at need is sufficient.

After that, the controller 33 transmits $X_i^{(k)}$, $W_{ij}^{(k)}$, and $h_i^{(k)}$ to the optimization unit 31 (step S14).

Next, the controller 33 receives $x_i^{(k)}$ which the optimization unit 31 obtains by an update process based on a stochastic search (step S15) and updates $x_i^{(k)}$ of values $x_i$ of all the neurons stored in the memory 33a on the basis of the received $x_i^{(k)}$ (step S16).

The controller 33 determines whether or not it has selected all k's (k=1 to m in the example of FIG. 1) (step S17). If the controller 33 has not selected all k's, then the controller 33 returns to step S10 and selects the next k.

If the controller 33 has selected all k's, then the controller 33 outputs (transmits to the whole control unit 34, for example) the values $x_i$ of all the neurons stored in the memory 33a as a calculation result (solution) of an optimization problem (step S18) and ends the process.

An example of the order in which k is selected will now be described.

Figure 6:
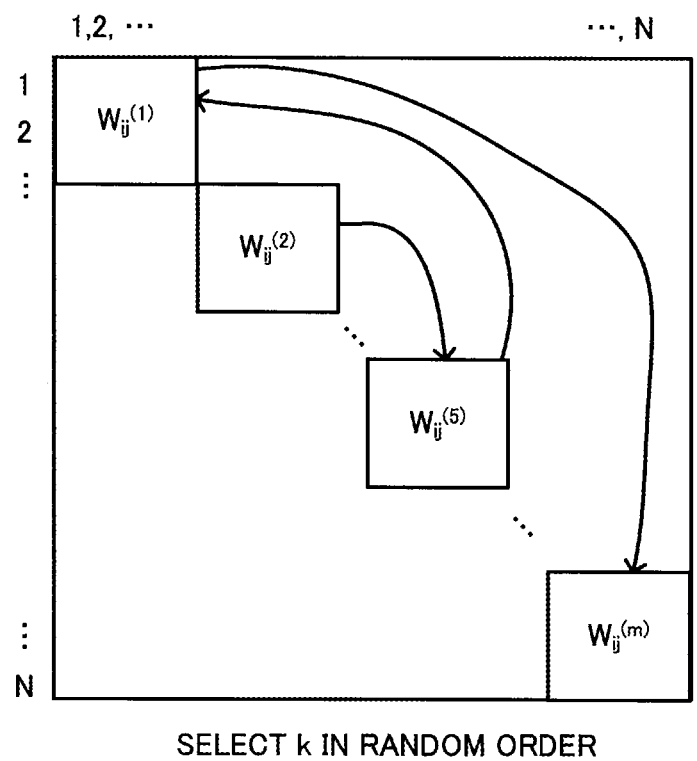
FIG. 6 illustrates an example of selecting k in random order.

FIG. 6 illustrates an example of selecting k in random order.

FIG. 6 illustrates an example in which the controller 33 selects k in random order by the use of a weighting coefficient matrix. In FIG. 6, for example, k is selected in the order of k=2, k=5, k=1, and k=m.

Figure 7:
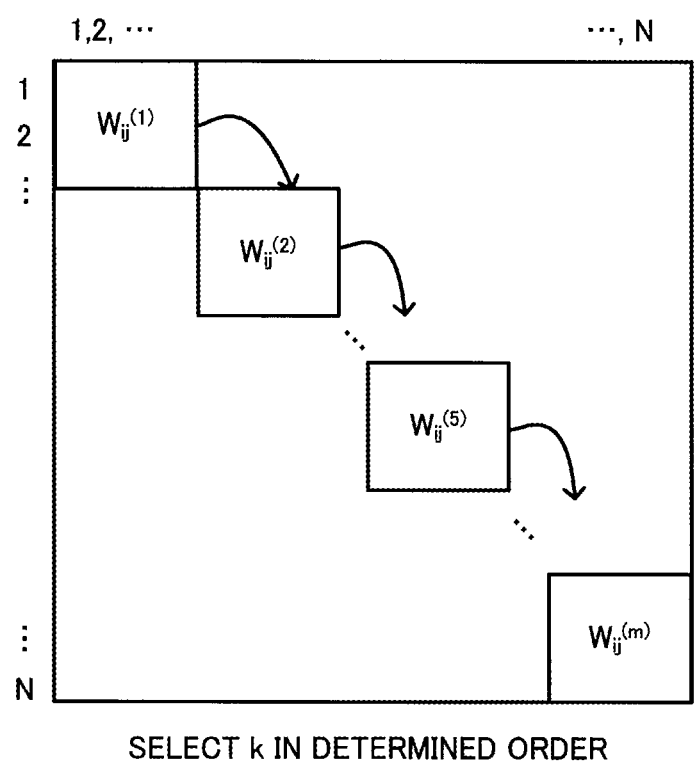
FIG. 7 illustrates an example of selecting k in determined order.

FIG. 7 illustrates an example of selecting k in determined order.

FIG. 7 illustrates an example in which the controller 33 selects k in determined order by the use of a weighting coefficient matrix. In FIG. 7, for example, k is selected in the order of k=1, k=2, k=5, . . . , and k=m.

An example of the operation of the CPU 32 will now be described.

Figure 8:
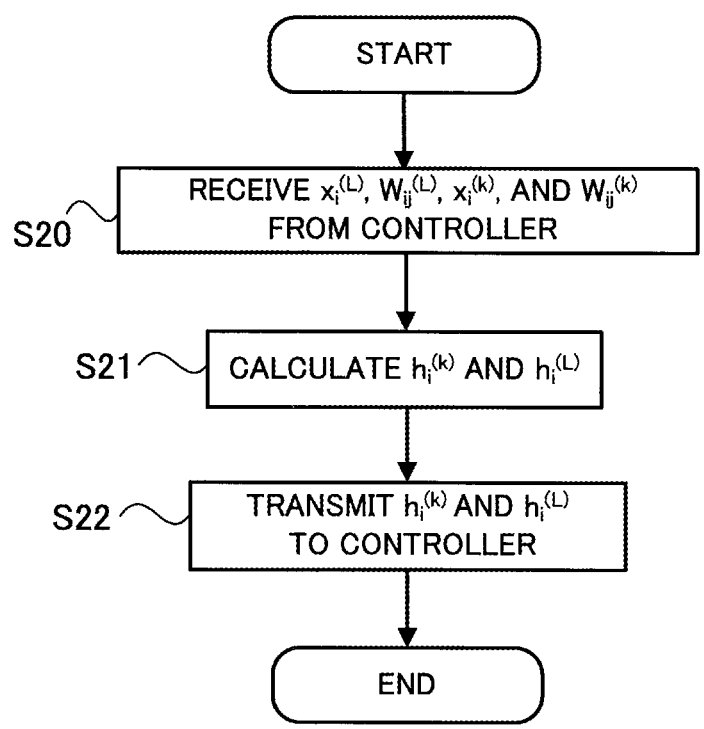
FIG. 8 is a flow chart illustrative of the flow of an example of the operation of a CPU.

FIG. 8 is a flow chart illustrative of the flow of an example of the operation of the CPU.

The CPU 32 receives $x_i^{(L)}$, $W_{ij}^{(L)}$, $x_i^{(k)}$, and $W_{ij}^{(k)}$ from the controller 33 (step S20). Furthermore, on the basis of the received data, the CPU 32 calculates a local field $h_i^{(k)}$ and a change portion $h_i^{(L)}$ by the use of expression (4) (step S21). In expression (4), $x_1^{(k)}$ and $W_{ij}^{(k)}$ are used for the product-sum operation of the first term of the right side and $x_i^{(L)}$ and $W_{ij}^{(L)}$ are used for the product-sum operation of the third term of the right side. The result of the product-sum operation of the third term is the change portion $h_i^{(L)}$.

After that, the CPU 32 transmits the calculated local field $h_1^{(k)}$ and change portion $h_1^{(L)}$ to the controller 33 (step S22) and ends the process.

An example of the operation of the optimization unit 31 will now be described.

Figure 9:
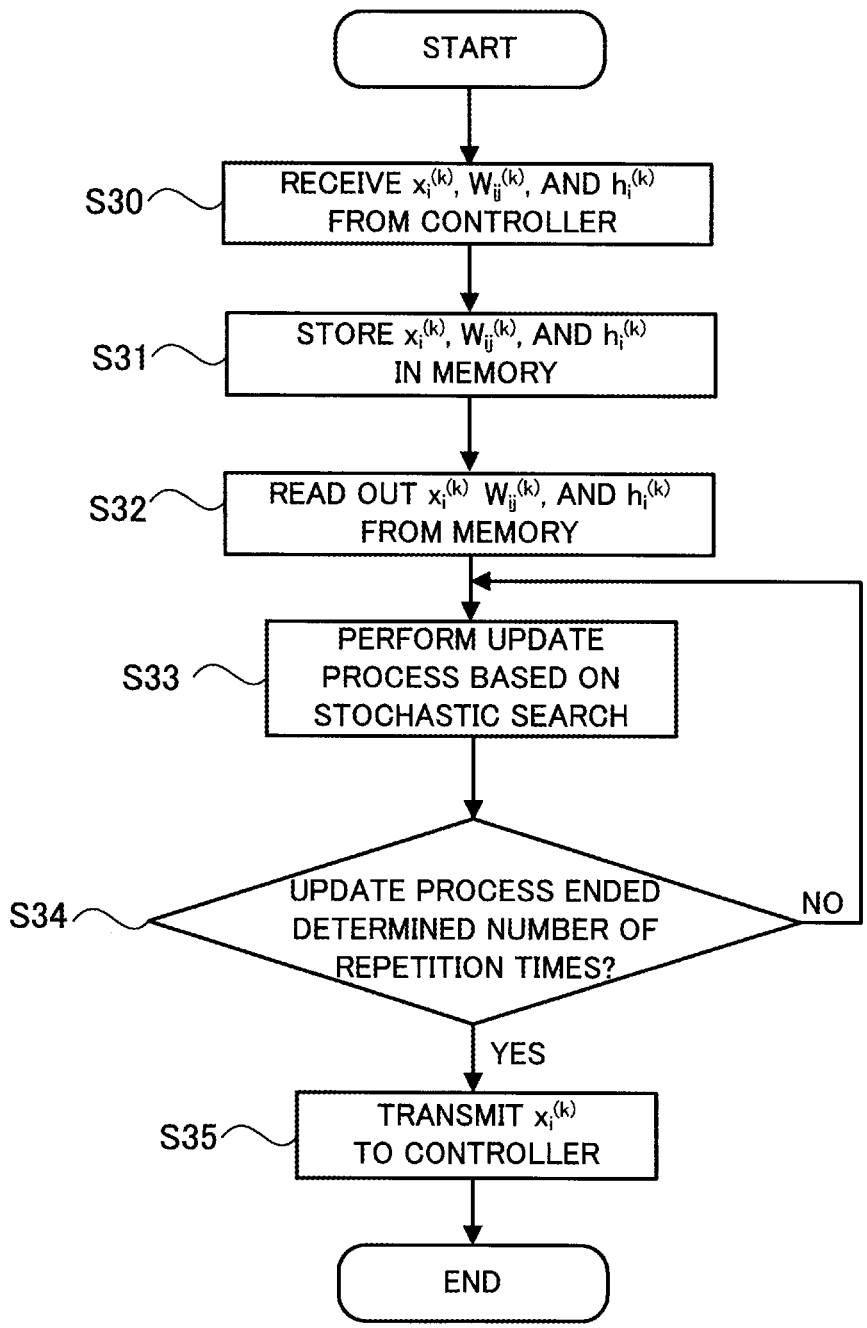
FIG. 9 is a flow chart illustrative of the flow of an example of the operation of an optimization unit.

FIG. 9 is a flow chart illustrative of the flow of an example of the operation of the optimization unit.

The optimization unit 31 receives $x_i^{(k)}$, $W_{ij}^{(k)}$, and $h_i^{(k)}$ from the controller 33 (step S30) and stores them in, for example, the memory 40b illustrated in FIG. 4 (step S31). Furthermore, the optimization unit 31 reads out $x_i^{(k)}$, $W_{ij}^{(k)}$, and $h_1^{(k)}$ from the memory 40b (step S32). $x_i^{(k)}$, $W_{ij}^{(k)}$, and $h_i^{(k)}$ read out from the memory 40b are set in registers (registers 41, 46, and 50, for example) of the neuron circuits 40a1 through 40an. $x_i^{(k)}$ and $h_i^{(k)}$ are used as initial values. After that, an update process based on a stochastic search is performed by the above operation of the neuron circuits 40a1 through 40an and the update control circuit 40e (step S33).

The control circuit 40c of the optimization unit 31 determines whether or not an update process has ended a determined number of repetition times (step S34). If an update process has not ended the determined number of repetition times, then step S33 is repeated. If an update process has ended the determined number of repetition times, then the optimization unit 31 transmits $x_i^{(k)}$ after the update processes to the controller 33 (step S35) and ends the process. The determined number of repetition times is the number of times by which $\Delta h_i$ in expression (5) is considered to have converged to 0, and is set to, for example, about a million times.

With the above optimization system 30 according to the second embodiment, the CPU 32 is made to calculate an energy change portion $h_i^{(L)}$ caused by the influence of the other neuron groups. This reduces the amount of the hardware of the optimization unit 31. As a result, even a small amount of hardware enables a large-scale operation. In addition, there is no need to load into the optimization unit 31 a weighting coefficient indicative of coupling strength between a neuron which belongs to a selected neuron group and a neuron which does not belong to the selected neuron group. This reduces calculation time and power consumption. Moreover, the optimization unit 31 accommodates a change in the scale of an optimization problem. As a result, great flexibility is realized.

In the above description, the optimization unit 31 performs update processes based on a stochastic search from first to last. However, the CPU 32 may perform the first update process. In that case, the controller 33 transmits $x_i^{(k)}$ which the CPU 32 obtains by performing the first update process to the optimization unit 31 as an initial value.

Third Embodiment

Figure 10:
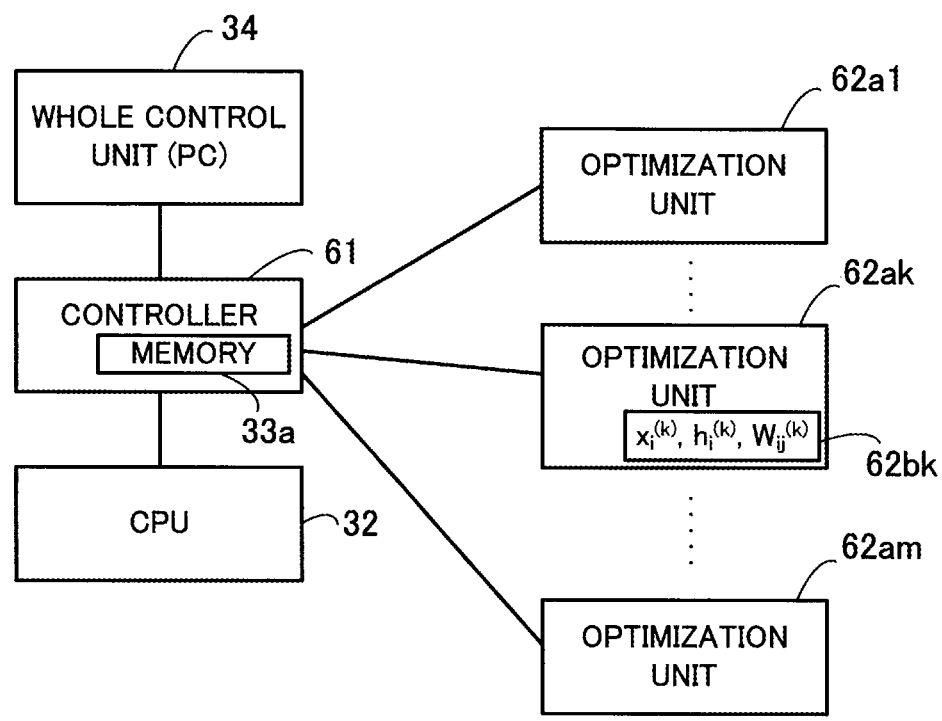
FIG. 10 illustrates an example of an optimization system according to a third embodiment.

FIG. 10 illustrates an example of an optimization system according to a third embodiment. Components in FIG. 10 which are the same as those of the optimization system 30 according to the second embodiment illustrated in FIG. 3 are marked with the same numerals.

An optimization system 60 includes optimization units 62a1, 62ak, . . . , and 62am. The optimization units 62a1 through 62am perform update processes for different neuron groups. Each of the optimization units 62a1 through 62am is realized by one-chip circuit. This is the same with the optimization unit 31 illustrated in FIG. 4. A controller 61 differs from the controller 33 of the optimization system 30 according to the second embodiment in that it performs the following process.

Figure 11:
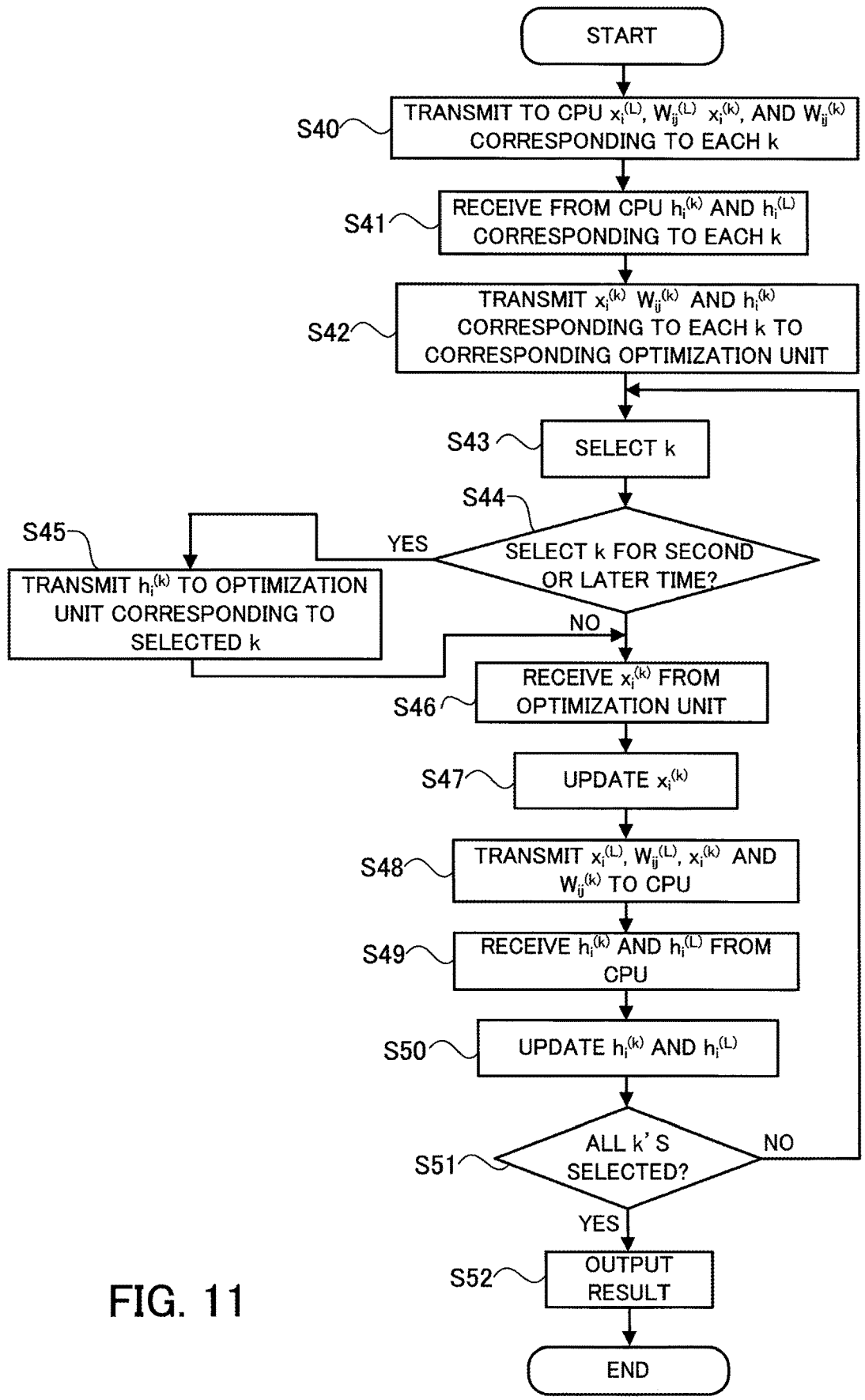
FIG. 11 is a flow chart illustrative of the flow of an example of the operation of a controller included in the optimization system according to the third embodiment.

FIG. 11 is a flow chart illustrative of the flow of an example of the operation of the controller included in the optimization system according to the third embodiment.

First the controller 61 transmits to a CPU 32 $x_i^{(L)}$, $x_i^{(k)}$, and $W_{ij}^{(k)}$ corresponding to each k (k=1 to m) (step S40).

Next, the controller 61 receives from the CPU 32 a local field $h_i^{(k)}$ and a change portion $h_i^{(L)}$ corresponding to each k which the CPU 32 calculates on the basis of the above data (step S41).

After that, the controller 61 transmits $X_i^{(k)}$, $W_{ij}^{(k)}$, and $h_i^{(k)}$ corresponding to each k to a corresponding optimization unit (step S42). For example, $x_i^{(1)}$, $W_{ij}^{(1)}$, and $h_i^{(1)}$ corresponding to k=1 are transmitted to the optimization unit 62a1 and $x_i^{(m)}$, $W_{ij}^{(m)}$, and $h_i^{(m)}$ corresponding to k=m are transmitted to the optimization unit 62am.

Next, the controller 61 selects k (step S43). After that, the controller 61 determines whether or not it selects k for the second or later time (step S44). If the controller 61 selects k for the first time, then step S46 is performed. If the controller 61 selects k for the second or later time, then the controller 61 transmits the local field $h_i^{(k)}$ to an optimization unit corresponding to the selected k (step S45).

As illustrated in FIG. 6 or 7, k is selected in random order or in determined order. If k is selected in determined order, it is possible to transmit a local field $h_i^{(k)}$ to an optimization unit corresponding to k selected next while an optimization unit corresponding to k selected last is repeating a stochastic search.

After step S44 or step S45, the controller 61 receives $x_i^{(k)}$ which the optimization unit corresponding to the selected k obtains by an update process based on a stochastic search (step S46). Furthermore, on the basis of the received $x_i^{(k)}$, the controller 61 updates $x_i^{(k)}$ of values $x_i$ of all neurons stored in a memory 33a (step S47).

After that, the controller 61 transmits to the CPU 32 $x_i^{(L)}$, $W_{ij}^{(L)}$, $x_i^{(k)}$, and $W_{ij}^{(k)}$ corresponding to the selected k (step S48). Furthermore, the controller 61 receives from the CPU 32 a local field $h_i^{(k)}$ and a change portion $h_i^{(L)}$ which the CPU 32 calculates on the basis of the above data (step S49). In addition, the controller 61 updates a local field $h_i^{(k)}$ and a change portion $h_i^{(L)}$ stored in the memory 33a (step S50). Updating the change portion $h_i^{(L)}$ at need is sufficient.

After that, the controller 61 determines whether or not it has selected all k's (step S51). If the controller 61 has not selected all k's, then the controller 61 returns to step S43 and selects the next k.

If the controller 61 has selected all k's, then the controller 61 outputs (transmits to a whole control unit 34, for example) the values $x_i$ of all the neurons stored in the memory 33a as a calculation result (solution) of an optimization problem (step S52) and ends the process.

A process performed by the CPU 32 is the same as that illustrated in FIG. 8. That is to say, the CPU 32 calculates a local field $h_i^{(k)}$ and a change portion $h_i^{(L)}$ on the basis of data received from the controller 61, and transmits them to the controller 61.

Each of the optimization units 62a1 through 62am receives the data which the controller 61 transmits in step S42 of FIG. 11 and stores them in its memory (memory 62bk illustrated in FIG. 10, for example).

An example of the operation of an optimization unit 62ak corresponding to k selected by the controller 61 will now be described. If the optimization unit 62ak corresponds to k selected for the first time by the controller 61, then the optimization unit 62ak performs a process which is almost the same as that illustrated in FIG. 9. That is to say, the optimization unit 62ak reads out $x_i^{(k)}$, $h_i^{(k)}$, and $W_{ij}^{(k)}$ stored in the memory 62bk and sets them in the registers (registers 41, 46, and 50, for example) of the neuron circuits 40a1 through 40an illustrated in FIG. 4. After the optimization unit 62ak repeats an update process based on a stochastic search a determined number of times, the optimization unit 62ak transmits $x_i^{(k)}$ to the controller 61.

Figure 12:
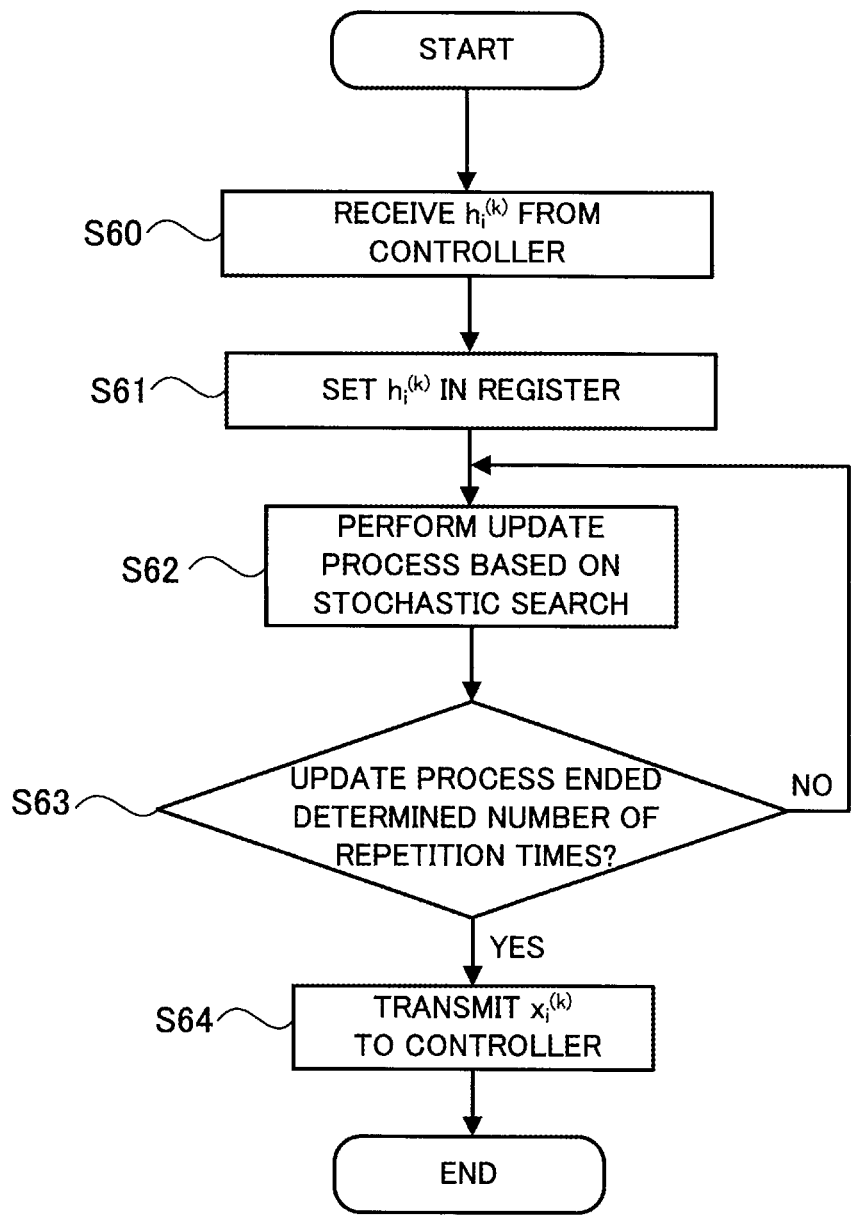
FIG. 12 is a flow chart illustrative of the flow of an example of the operation of an optimization apparatus corresponding to k selected for the second or later time by the controller.

FIG. 12 is a flow chart illustrative of the flow of an example of the operation of the optimization apparatus corresponding to k selected for the second or later time by the controller.

The optimization unit 62ak receives the local field $h_i^{(k)}$ which the controller 61 transmits in step S45 of FIG. 11 (step S60).

Furthermore, the optimization unit 62ak set the received local field $h_i^{(k)}$ in, for example, the register 46 illustrated in FIG. 4 as an initial value at the time of performing an update process (step S61).

After that, the optimization unit 62ak performs an update process based on a stochastic search by the above operation of the neuron circuits 40a1 through 40an and the update control circuit 40e by the use of $x_i^{(k)}$ and $W_{ij}^{(k)}$ stored in advance in the memory 62bk (step S62).

The optimization unit 62ak determines whether or not an update process has ended a determined number of repetition times (step S63). If an update process has not ended the determined number of repetition times, then step S62 is repeated. If an update process has ended the determined number of repetition times, then the optimization unit 62ak transmits $x_i^{(k)}$ after the update processes to the controller 61 (step S64) and ends the process.

With the above optimization system 60 according to the third embodiment, the CPU 32 is made to calculate an energy change portion $h_i^{(L)}$ caused by the influence of the other neuron groups. This reduces the amount of the hardware of each of the optimization unit 62a1 through 62am. As a result, even a small amount of hardware enables a large-scale operation.

Furthermore, with the optimization system 60 according to the third embodiment the optimization unit 62a1 through 62am perform update processes for different neuron groups. Therefore, if initial values of $x_i^{(k)}$ and $h_i^{(k)}$ and $W_{ij}^{(k)}$ are stored once in memories of the optimization unit 62a1 through 62am, then there is no need for the controller 61 to transmit these data again to the optimization unit 62a1 through 62am. When k is selected for the second or later time, the controller 61 need only transmit an updated local field $h_i^{(k)}$ to an optimization unit corresponding to the selected k. This suppresses a data movement amount.

In the above description the number of the optimization units is the same as that of the neuron groups. However, in order to reduce the amount of hardware, the number of optimization units may be smaller than that of neuron groups. In that case, any of the optimization units performs the process of updating values of a plurality of neuron groups. This is the same with the optimization unit 31 in the second embodiment.

Fourth Embodiment

Figure 13:
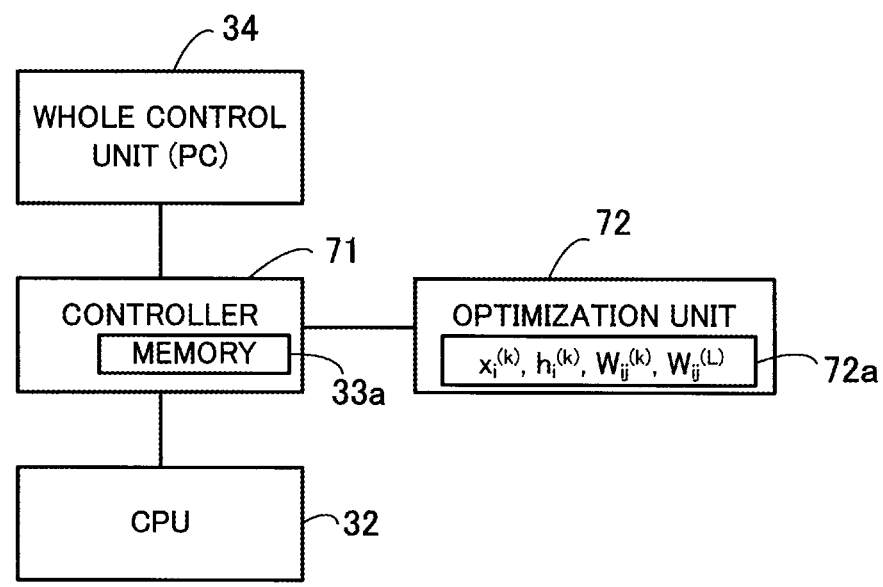
FIG. 13 illustrates an example of an optimization system according to a fourth embodiment.

FIG. 13 illustrates an example of an optimization system according to a fourth embodiment. Components in FIG. 13 which are the same as those of the optimization system 30 according to the second embodiment illustrated in FIG. 3 are marked with the same numerals.

If a controller 71 selects k (corresponding to selecting a neuron group), a memory 72a of an optimization unit 72 included in an optimization system 70 according to a fourth embodiment stores not only $x_i^{(k)}$, $h_i^{(k)}$, and $W_{ij}^{(k)}$ corresponding to the selected k but also $W_{ij}^{(L)}$. $W_{ij}^{(L)}$ is a weighting coefficient group indicative of coupling strength between a neuron which belongs to the selected neuron group and one or more neurons which are coupled to the neuron and which belong to another neuron group. If the controller 71 selects the next k, the optimization unit 72 receives from the controller 71 $\Delta x_i^{(k)}$ which is information regarding an updated neuron including a value of the neuron updated at the time of selecting the previous k and an index. Furthermore, the optimization unit 72 updates the local field $h_i^{(k)}$ on the basis of $\Delta x_i^{(k)}$ and $W_{ij}^{(L)}$.

Figure 14:
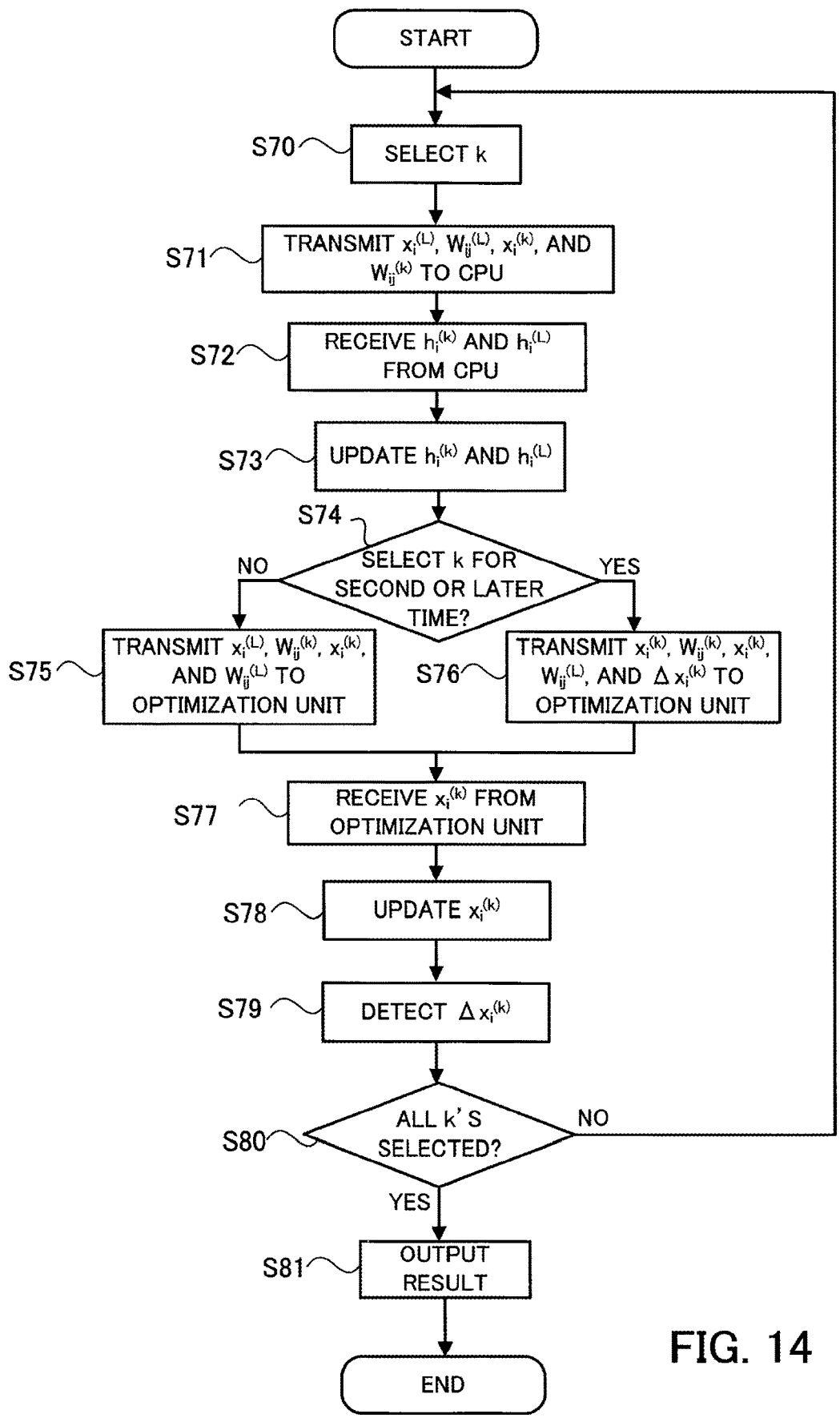
FIG. 14 is a flow chart illustrative of the flow of an example of the operation of a controller included in the optimization system according to the fourth embodiment.

FIG. 14 is a flow chart illustrative of the flow of an example of the operation of the controller included in the optimization system according to the fourth embodiment.

Steps S70 through S73 are the same as the process (as steps S10 through S13, respectively, of FIG. 5) performed by the controller 33 included in the optimization system 30 according to the second embodiment.

After step S73, the controller 71 determines whether or not it selects k for the second or later time (step S74). If the controller 71 selects k for the first time, then the controller 71 transmits $x_i^{(k)}$, $W_{ij}^{(k)}$, $h_i^{(k)}$, and $W_{ij}^{(L)}$ to the optimization unit 72 (step S75). If the controller 71 selects k for the second or later time, then the controller 71 transmits $x_i^{(k)}$, $W_{ij}^{(k)}$, $h_i^{(k)}$, $W_{ij}^{(L)}$, and $\Delta x_i^{(k)}$ to the optimization unit 72 (step S76).

After step S75 or S76, the controller 71 receives $x_i^{(k)}$ which the optimization unit 72 obtains by an update process based on a stochastic search (step S77). Furthermore, on the basis of the received $x_i^{(k)}$, the controller 71 updates $x_i^{(k)}$ of values $x_i$ of all neurons stored in a memory 33a (step S78). In addition, on the basis of $x_i^{(k)}$, the controller 71 detects $\Delta x_i^{(k)}$ including a value of an updated neuron (whose value has changed) and an index (step S79).

After that, the controller 71 determines whether or not it has selected all k's (step S80). If the controller 71 has not selected all k's, then the controller 71 returns to step S70 and selects the next k.

If the controller 71 has selected all k's, then the controller 71 outputs the values $x_i$ of all the neurons stored in the memory 33a as a calculation result (solution) of an optimization problem (step S81) and ends the process.

A process performed by a CPU 32 is the same as that illustrated in FIG. 8. That is to say, the CPU 32 calculates a local field $h_i^{(k)}$ and a change portion $h_i^{(L)}$ on the basis of data received from the controller 71, and transmits them to the controller 71.

An example of the operation of the optimization unit 72 will now be described. If the controller 71 selects k for the first time, the operation of the optimization unit 72 is almost the same as that of the optimization unit 31 illustrated in FIG. 9. The operation of the optimization unit 72 differs from that of the optimization unit 31 only in that the optimization unit 72 receives not only $x_i^{(k)}$, $h_i^{(k)}$, and $W_{ij}^{(k)}$ but also $W_{ij}^{(L)}$. from the controller 71 and stores them in a memory 72a. Accordingly, if the controller 71 selects k for the first time, description of the operation of the optimization unit 72 will be omitted.

Figure 15:
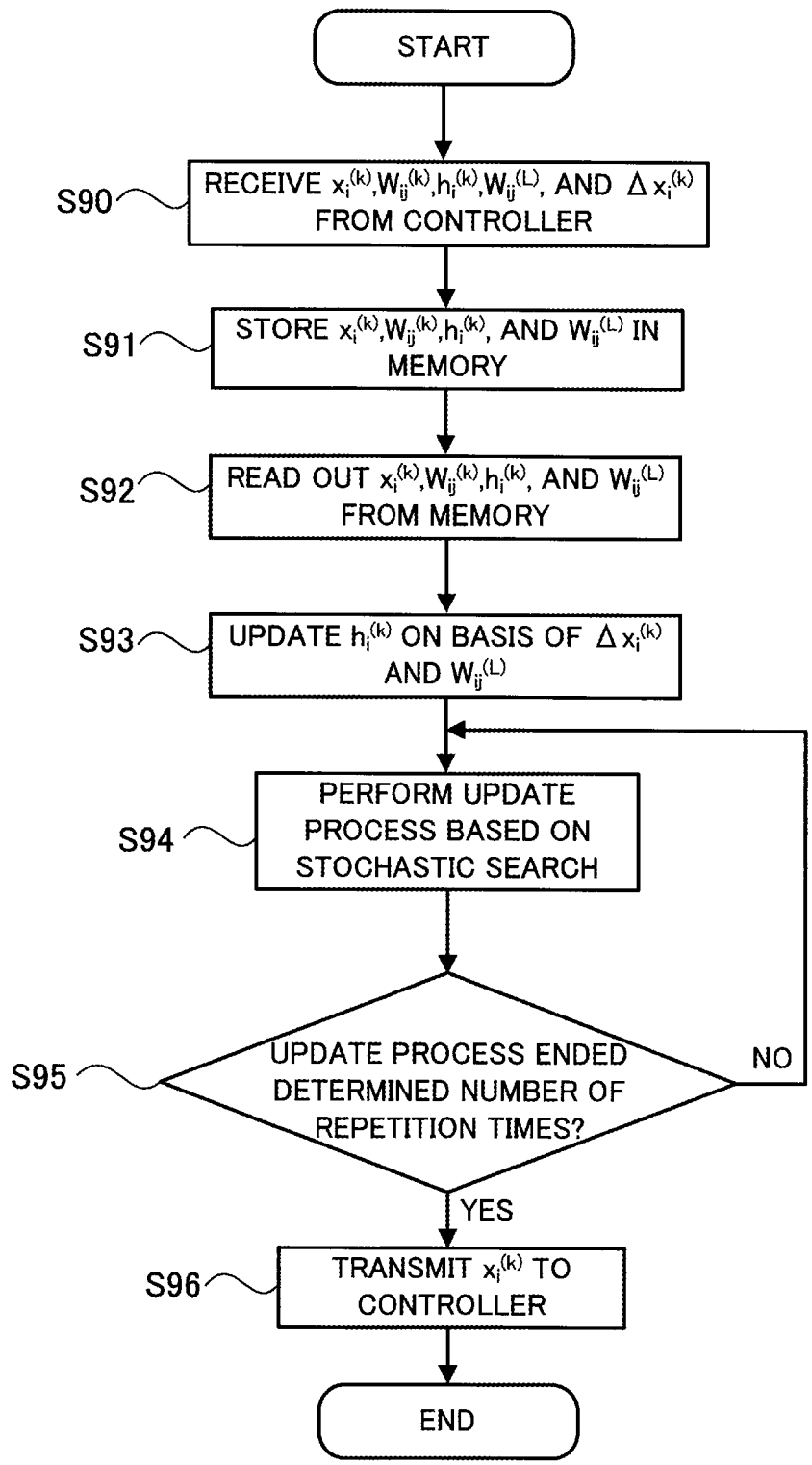
FIG. 15 is a flow chart illustrative of the flow of an example of the operation of an optimization apparatus performed in the case of the controller selecting k for the second or later time.

FIG. 15 is a flow chart illustrative of the flow of an example of the operation of the optimization apparatus performed in the case of the controller selecting k for the second or later time.

The optimization unit 72 receives $x_i^{(k)}$, $h_i^{(k)}$, $W_{ij}^{(L)}$, and $\Delta x_i^{(k)}$ from the controller 71 (step S90) and stores $x_i^{(k)}$, $W_{ij}^{(k)}$, $h_i^{(k)}$, and $W_{ij}^{(L)}$ in the memory 72a (step S91).

Furthermore, the optimization unit 72 reads out $x_i^{(k)}$, $W_{ij}^{(k)}$, $h_i^{(k)}$, and $W_{ij}^{(L)}$ from the memory 72a (step S92). $x_i^{(k)}$, $W_{ij}^{(k)}$, $h_i^{(k)}$, and $W_{ij}^{(L)}$ read out from the memory 72a are set in registers (registers 41, 46, and 50, for example) of neuron circuits 40a1 through 40an. $x_i^{(k)}$ and $h_i^{(k)}$ are used as initial values.

In addition, the optimization unit 72 updates the local field $h_i^{(k)}$ on the basis of $\Delta x_i^{(k)}$ and $W_{ij}^{(L)}$ (step S93). For example, if the optimization unit 72 is realized by the same circuit that is used for realizing the optimization unit 31 illustrated in FIG. 4, then $\Delta x_i^{(k)}$ is used in step S93 in place of a value of a neuron and an index outputted by an update control circuit 40e. That is to say, a value of a neuron updated at the time of selecting the previous k is supplied to a selection circuit 43 and an index of the neuron is supplied to a selection circuit 42. If there are a plurality of neurons updated at the time of selecting the previous k, then a value of each neuron and its index are supplied to the selection circuits 43 and 42, respectively, in order of, for example, index. As a result, the above change portion $h_i^{(L)}$ is updated and therefore the local field $h_i^{(k)}$ is updated.

After that, the optimization unit 72 performs an update process based on a stochastic search by the use of a value of a neuron and an index outputted by the update control circuit 40e (step S94).

The optimization unit 72 determines whether or not an update process has ended a determined number of repetition times (step S95). If an update process has not ended the determined number of repetition times, then step S94 is repeated. If an update process has ended the determined number of repetition times, then the optimization unit 72 transmits $x_i^{(k)}$ after the update processes to the controller 71 (step S96) and ends the process.

With the above optimization system 70 the same effect that is obtained by the optimization system 30 according to the second embodiment is achieved. In addition, the optimization unit 72 performs update of the local field $h_i^{(k)}$ in which a change of value of a neuron group selected the last time is reflected.

In the above description, the optimization unit 72 performs update processes based on a stochastic search from first to last. However, the CPU 32 may perform the first update process. In that case, the controller 71 transmits $x_i^{(k)}$ which the CPU 32 obtains by performing the first update process to the optimization unit 72 as an initial value.

Fifth Embodiment

Figure 16:
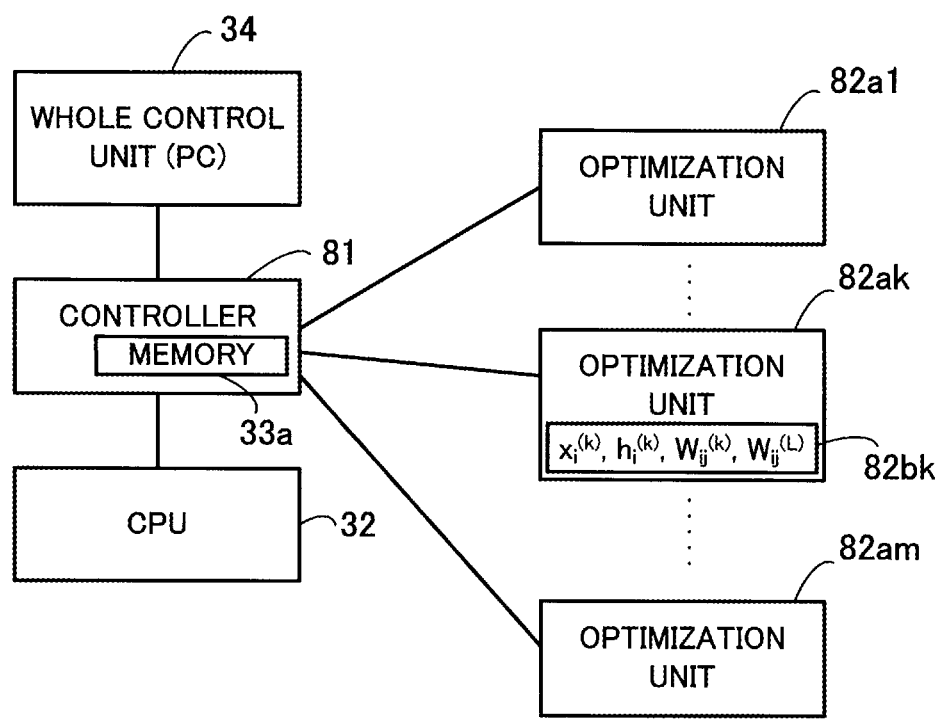
FIG. 16 illustrates an example of an optimization system according to a fifth embodiment.

FIG. 16 illustrates an example of an optimization system according to a fifth embodiment. Components in FIG. 16 which are the same as those of the optimization system 60 according to the third embodiment illustrated in FIG. 10 are marked with the same numerals.

An optimization system 80 includes optimization units 82a1, 82ak, . . . , and 82am. This is the same with the optimization system 60 according to the third embodiment. The optimization units 82a1 through 82am perform update processes for different neuron groups. However, not only $x_i^{(k)}$, $W_{ij}^{(k)}$, and $h_i^{(k)}$ but also the above $W_{ij}^{(L)}$ is stored in a memory (memory 82bk, for example) included in each of the optimization units 82a1 through 82am.

Figure 17:
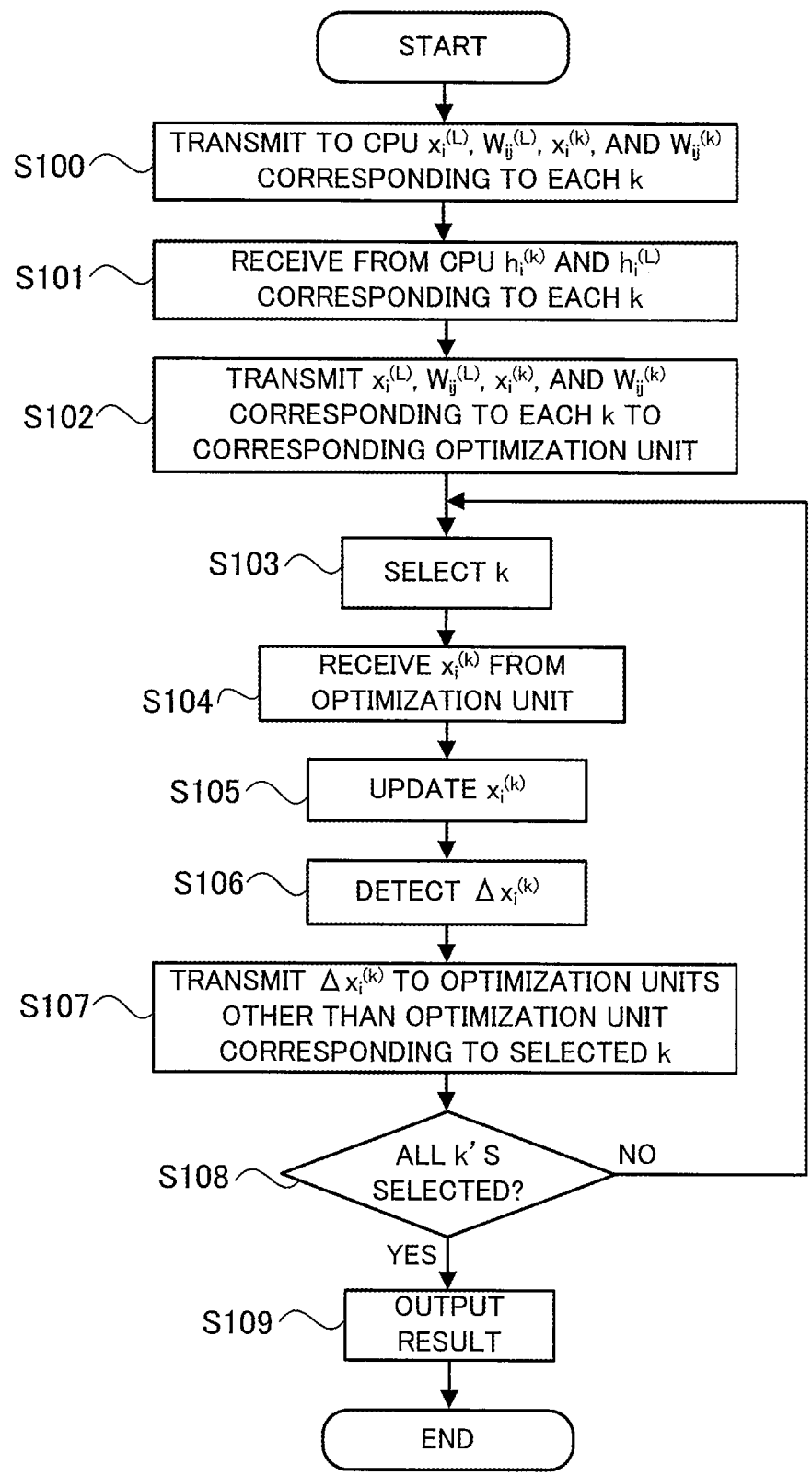
FIG. 17 is a flow chart illustrative of the flow of an example of the operation of a controller included in the optimization system according to the fifth embodiment.

FIG. 17 is a flow chart illustrative of the flow of an example of the operation of a controller included in the optimization system according to the fifth embodiment.

First a controller 81 transmits to a CPU 32 $x_i^{(L)}$, $W_{ij}^{(L)}$, $x_i^{(k)}$, and $W_{ij}^{(k)}$ corresponding to each k (k=1 to m) (step S100).

Next, the controller 81 receives from the CPU 32 a local field $h_i^{(k)}$ and a change portion $h_i^{(L)}$ corresponding to each k which the CPU 32 calculates on the basis of the above data (step S101).

After that, the controller 81 transmits $X_i^{(k)}$, $W_{ij}^{(k)}$, $h_i^{(k)}$, and $W_{ij}^{(L)}$ corresponding to each k to a corresponding optimization unit (step S102). For example, $W_{ij}^{(L)}$ corresponding to k=1 is the weighting coefficient groups ($W_{ij}^{(21)}$ through $W_{ij}^{(m1)}$) which are in the same column where the weighting coefficient group $W_{ij}^{(1)}$ illustrated in FIG. 1 is included.

Next, the controller 81 selects k (step S103). As illustrated in FIG. 6 or 7, k is selected in random order or in determined order.

After that, the controller 81 receives $x_i^{(k)}$ which the optimization unit corresponding to the selected k obtains by an update process based on a stochastic search (step S104). Furthermore, on the basis of the received $x_i^{(k)}$, the controller 81 updates $x_i^{(k)}$ of values $x_i$ of all neurons stored in a memory 33a (step S105).

In addition, on the basis of $x_i^{(k)}$, the controller 81 detects $\Delta x_i^{(k)}$ which is information regarding the updated neuron including a value of the neuron updated and an index (step S106). Furthermore, the controller 81 transmits $\Delta x_i^{(k)}$ to the optimization units other than the optimization unit corresponding to the selected k (step S107). For example, if k=1 is selected, then the controller 81 transmits $\Delta x_i^{(k)}$ to all of the optimization units 82a2 through 82am.

After that, the controller 81 determines whether or not it has selected all k's (step S108). If the controller 81 has not selected all k's, then the controller 81 returns to step S103 and selects the next k.

If the controller 81 has selected all k's, then the controller 81 outputs the values $x_i$ of all the neurons stored in the memory 33a as a calculation result (solution) of an optimization problem (step S109) and ends the process.

A process performed by the CPU 32 is the same as that illustrated in FIG. 8. That is to say, the CPU 32 calculates a local field $h_i^{(k)}$ and a change portion $h_i^{(L)}$ on the basis of data received from the controller 81, and transmits them to the controller 81.

An example of the operation of the optimization units 82a1 through 82am will now be described. An optimization unit corresponding to k selected for the first time by the controller 81 performs a process which is almost the same as that illustrated in FIG. 9. That is to say, the optimization unit reads out $x_i^{(k)}$, $h_i^{(k)}$, and $W_{ij}^{(k)}$ stored in its memory and sets them in the registers (registers 41, 46, and 50, for example) of the neuron circuits 40a1 through 40an illustrated in FIG. 4. After the optimization unit repeats an update process based on a stochastic search a determined number of times, the optimization unit transmits $x_i^{(k)}$ to the controller 81.

Figure 18:
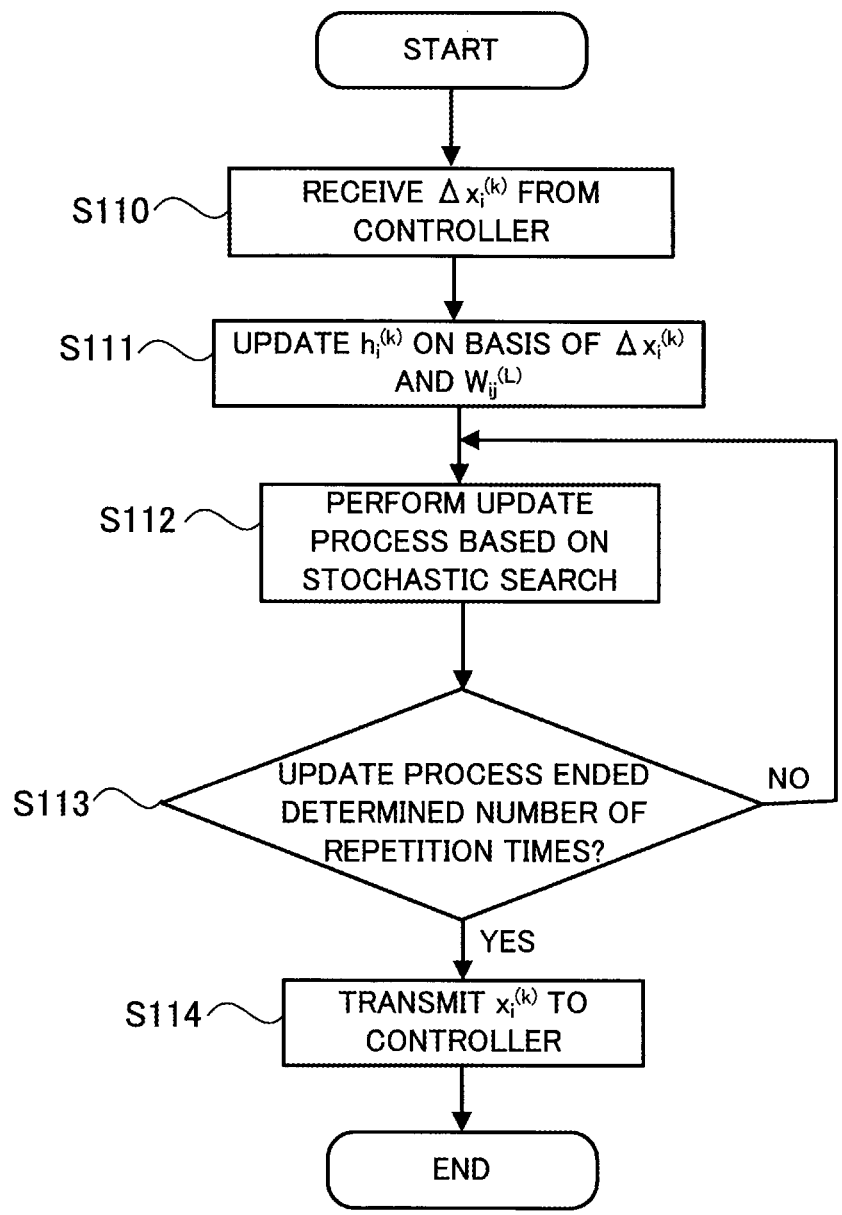
FIG. 18 is a flow chart illustrative of the flow of an example of the operation of an optimization apparatus corresponding to k selected for the second or later time by the controller.

FIG. 18 is a flow chart illustrative of the flow of an example of the operation of an optimization apparatus corresponding to k selected for the second or later time by the controller.

Hereinafter it is assumed that an optimization apparatus corresponding to k selected for the second or later time by the controller 81 is the optimization unit 82ak. On the basis of $x_i^{(k)}$ outputted by an optimization apparatus corresponding to k selected the last time, the optimization unit 82ak receives from the controller 81 $\Delta x_i^{(k)}$ which the controller 81 detects (step S110).

Furthermore, the optimization unit 82ak updates a local field $h_i^{(k)}$ on the basis of the received $\Delta x_i^{(k)}$ and $W_{ij}^{(L)}$ stored in advance in the memory 82bk (step S111). For example, if the optimization unit 82ak is realized by the same circuit that is used for realizing the optimization unit 31 illustrated in FIG. 4, then $\Delta x_i^{(k)}$ is used in step S111 in place of a value of a neuron and an index outputted by an update control circuit 40e. That is to say, a value of a neuron updated at the time of selecting the previous k is supplied to a selection circuit 43 and an index of the neuron is supplied to a selection circuit 42. If there are a plurality of neurons updated at the time of selecting the previous k, then a value of each neuron and its index are supplied to the selection circuits 43 and 42, respectively, in order of, for example, index. As a result, the above change portion $h_i^{(L)}$ is updated and therefore the local field $h_i^{(k)}$ is updated.

After that, the optimization unit 82ak performs an update process based on a stochastic search by the use of a value of a neuron and an index outputted by the update control circuit 40e (step S112).

The optimization unit 82ak determines whether or not an update process has ended a determined number of repetition times (step S113). If an update process has not ended the determined number of repetition times, then step S112 is repeated. If an update process has ended the determined number of repetition times, then the optimization unit 82ak transmits $x_i^{(k)}$ after the update processes to the controller 81 (step S114) and ends the process.

With the above optimization system 80 the same effect that is obtained by the optimization system 60 according to the third embodiment is achieved. In addition, each of the optimization units 82a1 through 82am performs an update of a local field $h_i^{(k)}$ in which a change of value of a neuron group selected the last time is reflected.

In the above description the number of the optimization units is the same as that of the neuron groups. However, in order to reduce the amount of hardware, the number of optimization units may be smaller than that of neuron groups. In that case, any of the optimization units performs the process of updating values of a plurality of neuron groups. This is the same with the optimization unit 31 in the second embodiment.

One aspect of the optimization system, the optimization apparatus, and the optimization system control method according to the present invention have been described on the basis of the embodiments. However, these embodiments are simple examples and the present invention is not limited to the above description.

According to one aspect, even a small amount of hardware enables a large-scale operation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An optimization system comprising:
    an optimization apparatus;
    an arithmetic processing apparatus; and
    a control apparatus,
    the optimization apparatus is configured to repeat an update process including a first process, a second process and a third process, the optimization apparatus calculates, in the first process, a first change portion of an energy change caused by a change in a value of a first neuron that belongs to a neuron group selected from all neurons corresponding to all state variables of an evaluation function indicative of an energy, the first change portion is caused by an influence of another neuron that belongs to the neuron group, the optimization apparatus determines, in the second process, by a stochastic search whether to allow an update of the value of the first neuron, based on a first sum of the first change portion which is calculated by the optimization apparatus and a second change portion of the energy change, the second change portion is caused by an influence of a second neuron that is included in all the neurons but does not belong to the neuron group and is calculated by the arithmetic processing apparatus, and the optimization apparatus updates or maintains, in the third process, the value of the first neuron according to a result of determining whether to allow the update;
    the arithmetic processing apparatus is configured to calculate the second change portion and calculate a first initial value of a second sum by adding a second initial value of the first change portion to the second change portion;
    the control apparatus is configured to select the neuron group from all the neurons, transmit to the arithmetic processing apparatus first data for calculating the second change portion and the second initial value, receive the first initial value from the arithmetic processing apparatus, transmit to the optimization apparatus the first initial value and second data which includes a first weighting coefficient group whose values are set so that the first neuron is coupled to all other neurons of the neuron group, and receive a value of the neuron group from the optimization apparatus;
    the optimization system further includes a plurality of optimization apparatuses including the optimization apparatus; and
    the plurality of optimization apparatuses perform the update process for different neuron groups,
    the optimization apparatus includes a memory and a plurality of integrators, the memory stores the first initial value received from the control apparatus, and a first integrator among the plurality of integrators acquires the first initial value from the memory, calculates the first change portion by accumulating a product of a value of a neuron included in the all other neurons and a weighting coefficient between the neuron and the first neuron and calculates the first sum by adding the first change portion to the first initial value, the weighting coefficient being included in the first weighting coefficient group.

2. The optimization system according to claim 1, wherein the first data includes a second weighting coefficient group whose values are set so that the first neuron is coupled to some of all the neurons, the some of the all the neurons including the second neuron.

3. The optimization system according to claim 1, wherein the control apparatus transmits, upon selection of a first neuron group, the first sum updated based on a value of a previously selected second neuron group received from a first optimization apparatus that has performed the update process for the second neuron group to a second optimization apparatus that performs the update process for the first neuron group.

4. The optimization system according to claim 2, wherein:
    the control apparatus transmits the second weighting coefficient group to the optimization apparatus, detects an updated neuron by the value of the neuron group received from the optimization apparatus, and transmits information regarding the updated neuron to the optimization apparatus; and
    the optimization apparatus updates the first sum, based on the second weighting coefficient group and the information received.

5. The optimization system according to claim 2, wherein the control apparatus transmits the second weighting coefficient group to the plurality of optimization apparatuses, detects an updated neuron by the value of the neuron group received from a first optimization apparatus that has performed the update process for the neuron group, and transmits information regarding the updated neuron to a second optimization apparatus different from the first optimization apparatus among the plurality of optimization apparatuses; and
    the second optimization apparatus updates the first sum, based on the second weighting coefficient group and the information received.

6. An optimization apparatus comprising:
    a storage section configured to store data for calculating a first change portion of an energy change caused by a change in a value of a first neuron that belongs to a neuron group selected from all neurons corresponding to all state variables of an evaluation function indicative of an energy, and the first change portion being caused by an influence of another neuron that belongs to the neuron group, the data including a first weighting coefficient group whose values are set so that the first neuron is coupled to all other neurons of the neuron group; and
    a stochastic search circuit configured to repeat an update process including a first process, a second process and a third process,
    the stochastic search circuit calculates, in the first process, the first change portion, based on the data,
    the stochastic search circuit determines, in the second process, by a stochastic search whether to allow an update of the value of the first neuron, based on a first sum of the first change portion and a second change portion of the energy change, the second change portion being caused by an influence of a second neuron that is included in all the neurons but does not belong to the neuron group and being calculated by an arithmetic processing apparatus, and the stochastic search circuit updates or maintains, in the third process, the value of the first neuron according to a result of determining whether to allow the update, the optimization apparatus further comprising:

a memory configured to store a first initial value of a second sum calculated by adding a second initial value of the first change portion to the second change portion, and a plurality of integrators configured to include a first integrator which acquires the first initial value from the memory, calculates the first change portion by accumulating a product of a value of a neuron included in the all other neurons and a weighting coefficient between the neuron and the first neuron and calculates the first sum by adding the first change portion to the first initial value, the weighting coefficient being included in the first weighting coefficient group.

7. An optimization system control method comprising:

repeating, by an optimization apparatus included in an optimization system, an update process including a first process, a second process and a third process;

calculating by the optimization apparatus, in the first process, a first change portion of an energy change caused by a change in a value of a first neuron that belongs to a neuron group selected from all neurons corresponding to all state variables of an evaluation function indicative of an energy, the first change portion being caused by an influence of another neuron that belongs to the neuron group;

determining by the optimization apparatus, in the second process, by a stochastic search whether to allow an update of the value of the first neuron, based on a first sum of the first change portion which is calculated by the optimization apparatus and a second change portion of the energy change, the second change portion being caused by an influence of a second neuron that is included in all the neurons but does not belong to the neuron group and being calculated by an arithmetic processing apparatus;

updating or maintaining by the optimization apparatus, in the third process, the value of the first neuron according to a result of determining whether to allow the update;

calculating, by the arithmetic processing apparatus included in the optimization system, the second change portion, calculating, by the arithmetic processing apparatus, a first initial value of a second sum by adding a second initial value of the first change portion to the second change portion; and selecting, by a control apparatus included in the optimization system, the neuron group from all the neurons, transmitting to the arithmetic processing apparatus first data for calculating the second change portion and the second initial value, receiving the first initial value from the arithmetic processing apparatus, transmitting to the optimization apparatus the first initial value and second data which includes a first weighting coefficient group whose values are set so that the first neuron is coupled to all other neurons of the neuron group, and receiving a value of the neuron group from the optimization apparatus, the optimization system includes a plurality of optimization apparatuses including the optimization apparatus, and the plurality of optimization apparatuses perform the update process for different neuron groups, the optimization apparatus includes a memory and a plurality of integrators, the memory stores the first initial value received from the control apparatus, and a first integrator among the plurality of integrators acquires the first initial value from the memory, calculates the first change portion by accumulating a product of a value of a neuron included in the all other neurons and a weighting coefficient between the neuron and the first neuron and calculates the first sum by adding the first change portion to the first initial value, the weighting coefficient being included in the first weighting coefficient group.

* * * * *